United States Patent [19]
Wegener

[11] Patent Number: 5,839,100
[45] Date of Patent: Nov. 17, 1998

[54] LOSSLESS AND LOSS-LIMITED COMPRESSION OF SAMPLED DATA SIGNALS

[76] Inventor: Albert William Wegener, 867 Jasmine Dr., Sunnyvale, Calif. 94086

[21] Appl. No.: 636,019

[22] Filed: Apr. 22, 1996

[51] Int. Cl.$^6$ ................ G10L 3/02; G10L 9/00; G10L 5/02
[52] U.S. Cl. ............ 704/220; 704/220; 704/212; 704/265
[58] Field of Search ................... 704/220, 212, 704/229, 230, 265

[56] References Cited

U.S. PATENT DOCUMENTS

| | | | |
|---|---|---|---|
| 4,546,342 | 10/1985 | Weaver et al. | 340/347 |
| 4,558,302 | 12/1985 | Welch | 340/347 |
| 4,680,797 | 7/1987 | Benke | 704/220 |
| 5,083,310 | 1/1992 | Drory | 381/30 |
| 5,142,656 | 8/1992 | Fielder et al. | 381/37 |
| 5,317,672 | 5/1994 | Crossman et al. | 704/230 |
| 5,394,508 | 2/1995 | Lim | 395/2.38 |

FOREIGN PATENT DOCUMENTS 2 117 608  10/1983  United Kingdom .

OTHER PUBLICATIONS

Gould, K W, et al: "Robust Speech Coding for the Indoor Wireless Channel". AT&T Technical Journal, Jul.–Aug. 1993, USA, vol. 72, No. 4 ISSN 8756–2324 pp. 64–73, XP000415860.

See p. 65, Left–hand Column, Line 14 — Right–hand Column, Line 17; FIG. 3.

See p. 67, Right–hand Column, Line 6 — p. 69, Left–hand Column, Line 7.

Cellier, et al., "Lossless Audio Data Compression for Real Tim Applications", Audio Engineering Society, New York, NY, Preprint 3780 (AES New York 7–10 Oct. 1993).

Crandall, "Tour of Lossless Data Compressors", Projects in Scientific Computation, Springer–Verlage New York, NY, pp. 297–317 (1994).

(List continued on next page.)

*Primary Examiner*—David R. Hudspeth
*Assistant Examiner*—Robert Louis Sax

[57] ABSTRACT

An efficient method for compressing audio and other sampled data signals without loss, or with a controlled amount of loss, is described. The compression apparatus contains a subset selector, an approximator, an adder, two derivative encoders, a header encoder, and a compressed block formatter. The decompression apparatus contains a compressed block parser, a header decoder, two integration decoders, an approximator, and an adder. The compressor first divides each block of input samples into a first subset and a second subset. The approximator uses the first subset samples to approximate the second subset samples. An error signal is created by subtracting the approximated second subset samples from the actual second subset samples. The first subset samples and error signal are separately encoded by the derivative encoders, which select the signal's derivative that requires the least amount of storage for a block floating point representation. A compressed block formatter combines the compression control parameters, encoded subset array, and encoded error array into a compressed block. The decompression apparatus first parses the compressed block into a header, an encoded first subset array, and an encoded error array. The header decoder recovers the compression control parameters from the header. Using the compression control parameters, the integration decoders reconstruct the first subset and error arrays from their block floating point representations. The approximator uses the first subset samples to approximate the original second subset samples. The adder combines the subset samples, the error samples, and the approximated second subset samples to identically re-create the original, uncompressed signal. An indexing method is described which allows random access to specific uncompressed samples within the stream of compressed blocks.

25 Claims, 16 Drawing Sheets

OTHER PUBLICATIONS

Davidson, et al., "High–Quality Audio Transform Moding at 128 KBITS/S", ICASSP Proceedings, Albuquerque, NM, pp. 1117–1120 (Apr. 1990).

ISO/MPEG Standard, "Coding of Moving Pictures and Associated Audio for Digital Storage Media at up to about 1.5 Mbit/s", Audio part (11172–3), ISO/IEC JTC1/SC29/WG11, pp. 1–37, (Nov. 1992).

Johnson, "Transform Coding of Audio Signals Using Perceptual Noise Criteria", IEEE Journal on Selected Area in Communications, vol. 6, No. 2, pp. 314–323, (Feb. 1988).

Maher, "An Efficient Scheme for Lossy Realtime Audio Data Compression", Audio Engineering Society, New York, NY, (1994). Preprint 3922 (AES San Francisco, 10–13 Nov. 1994).

Nelson, "Speech Compression", The Data Compression Book, M&T Books, San Mateo CA, pp. 313–329 (1992).

Robinson, "Shorten: Simple Lossless and Near–lossless Waveform Compression", Technical Report CUED/F–INFENG/TR.156, Cambridge University, Cambridge, U.K., (Dec. 1994).

Crowdwen, C., Hall, S.,Parametric Coding of Speech, Speech Processing, Essex Series, pp. 174–183, Jun. 1991.

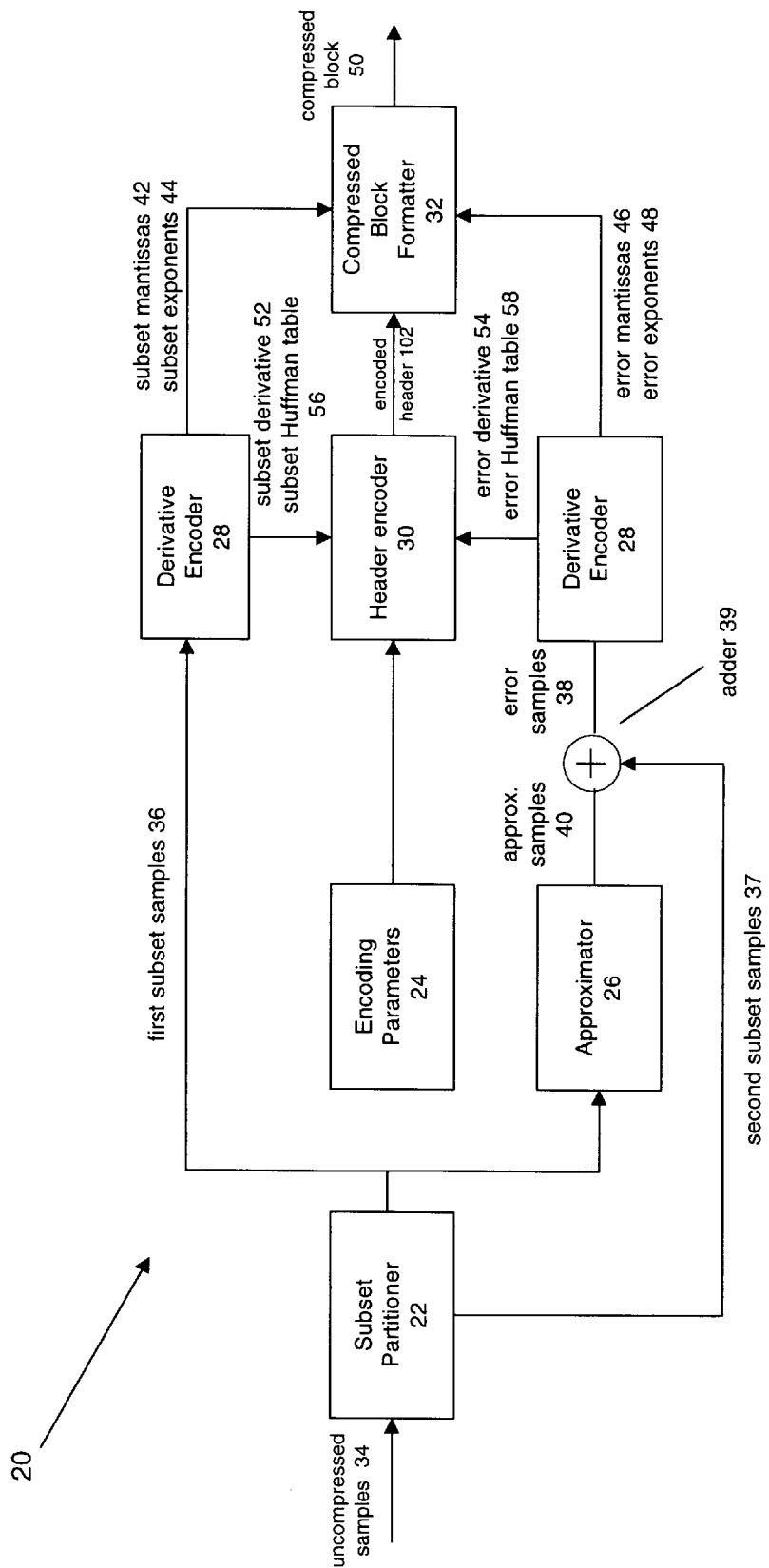
Figure 1: Encoder Diagram

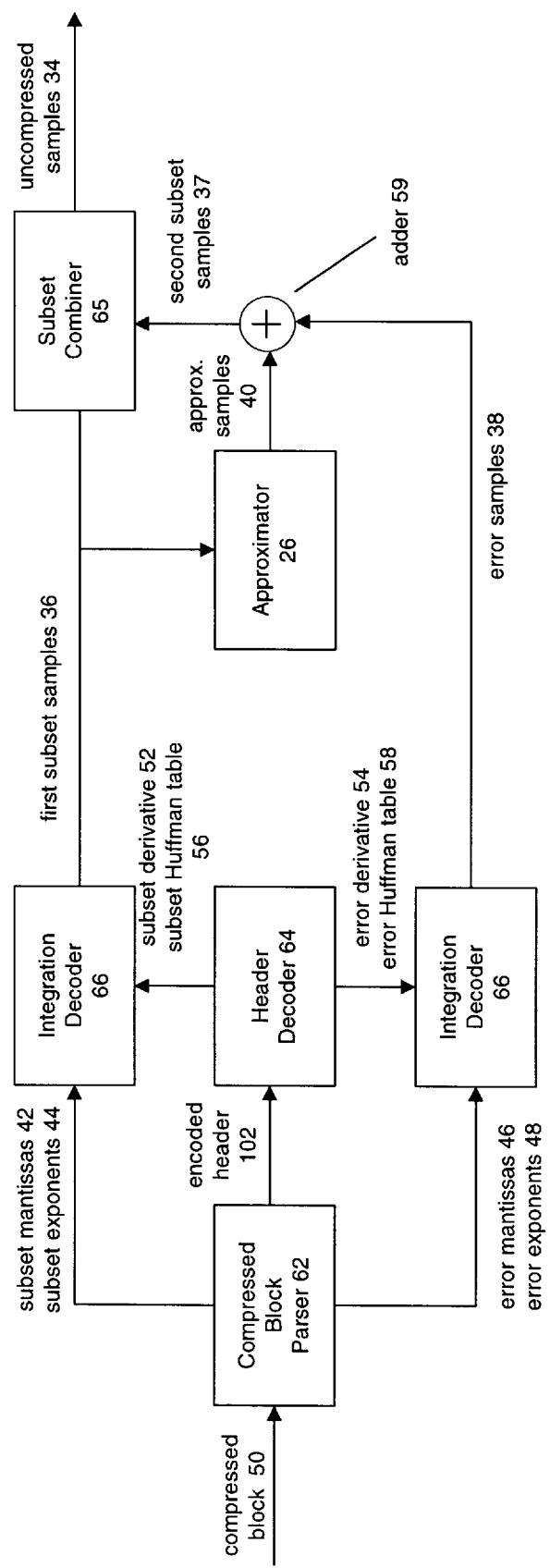
Figure 2: Decoder Diagram

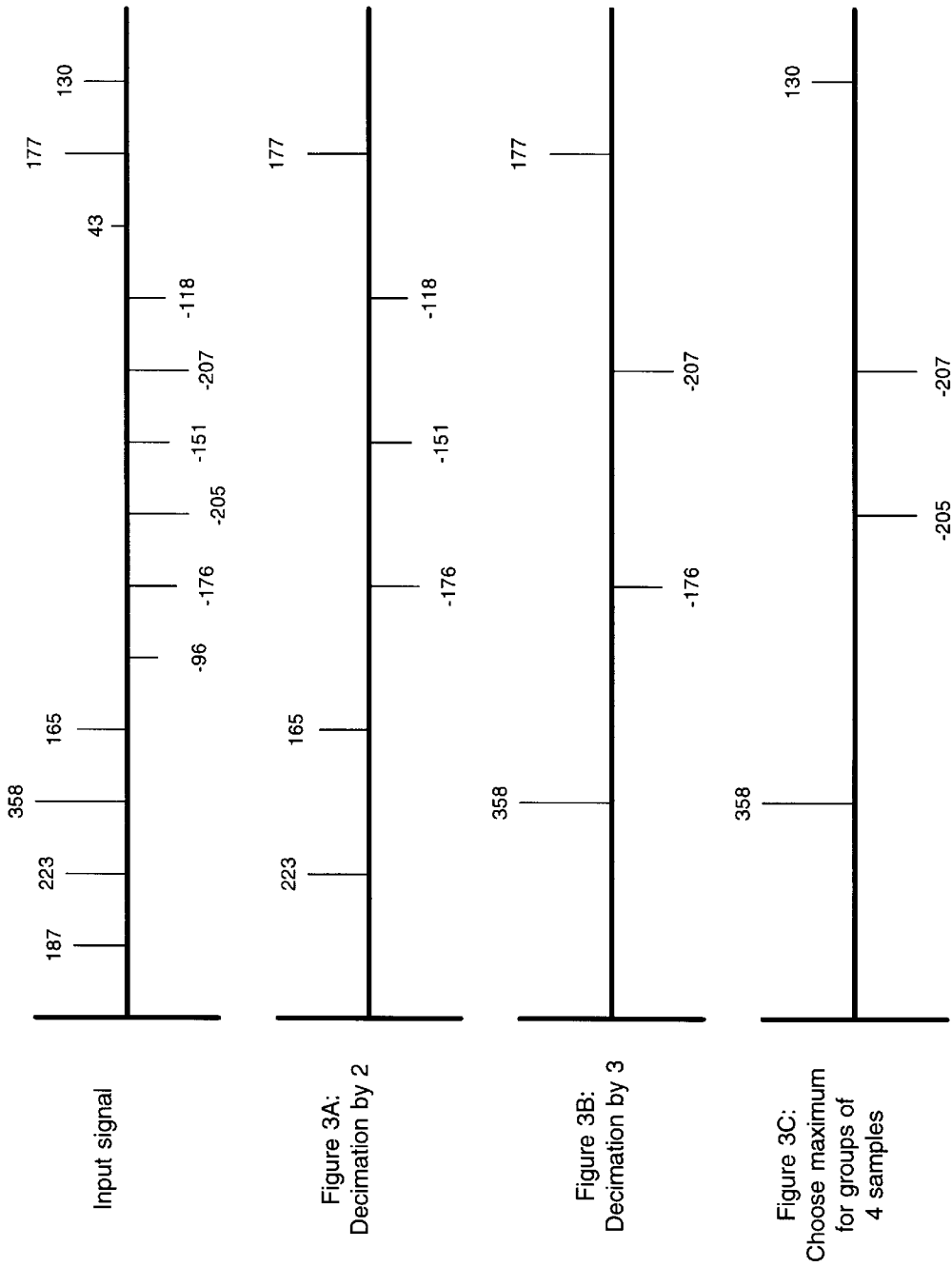

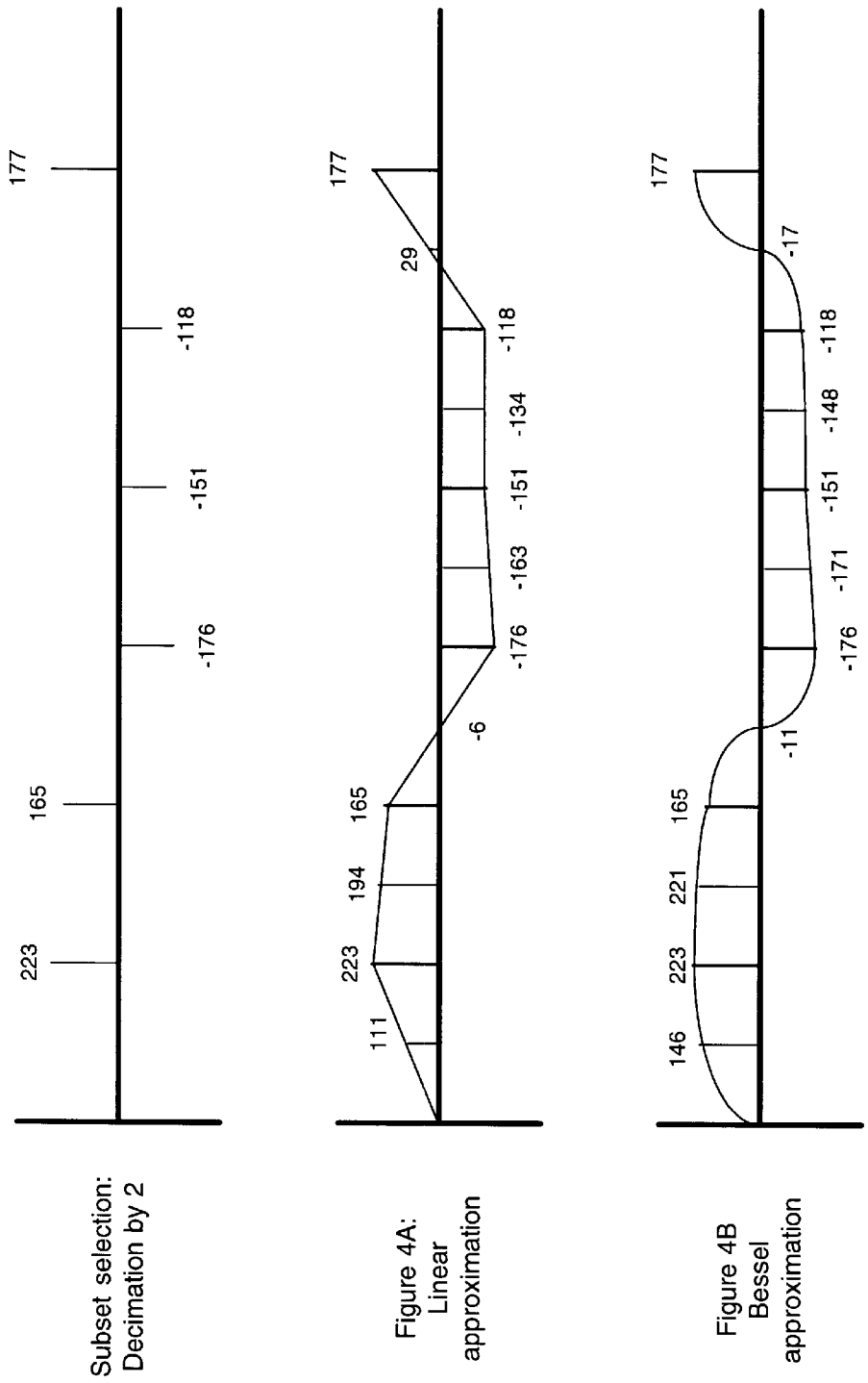

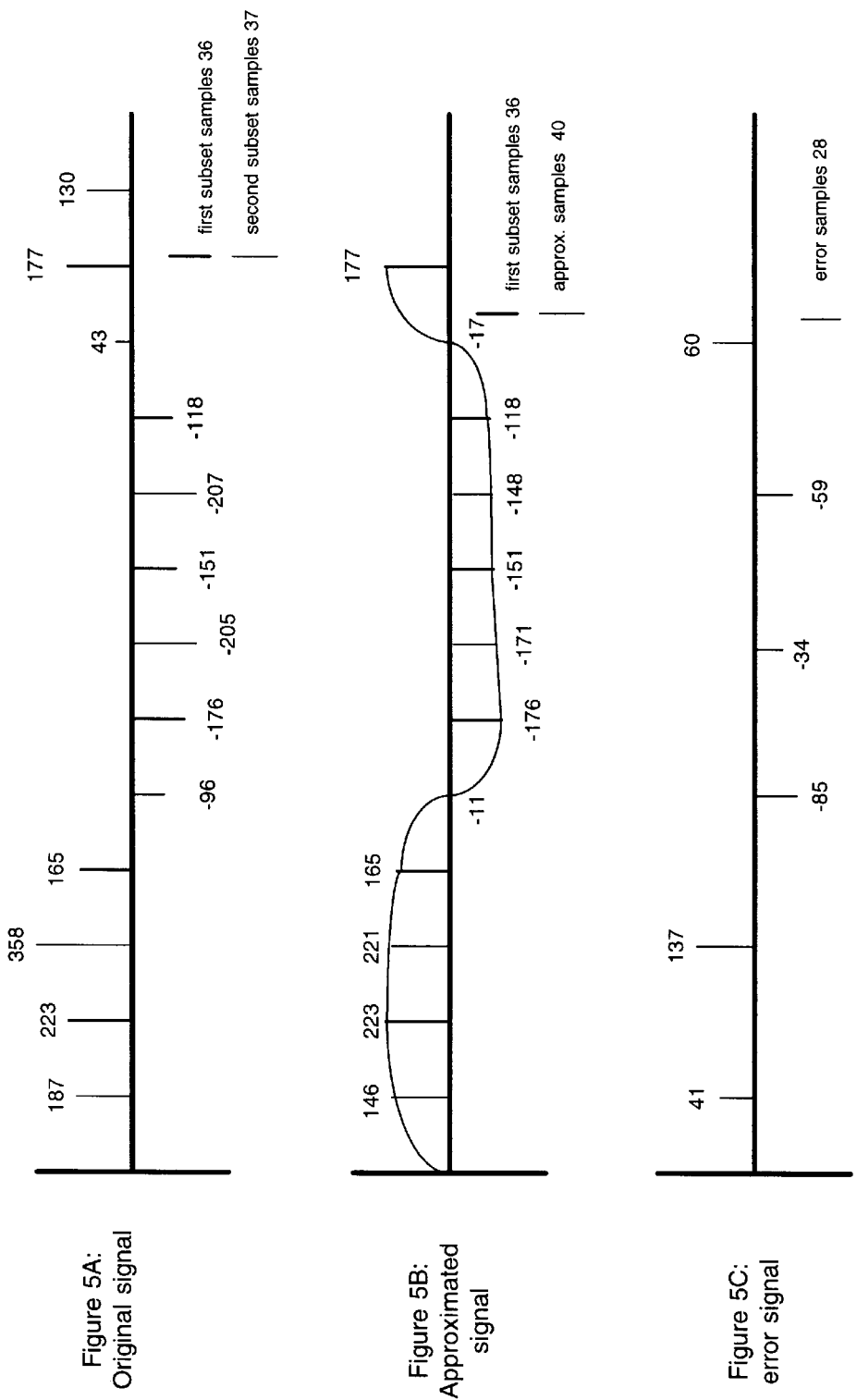
Figure 5: Error Array Generation

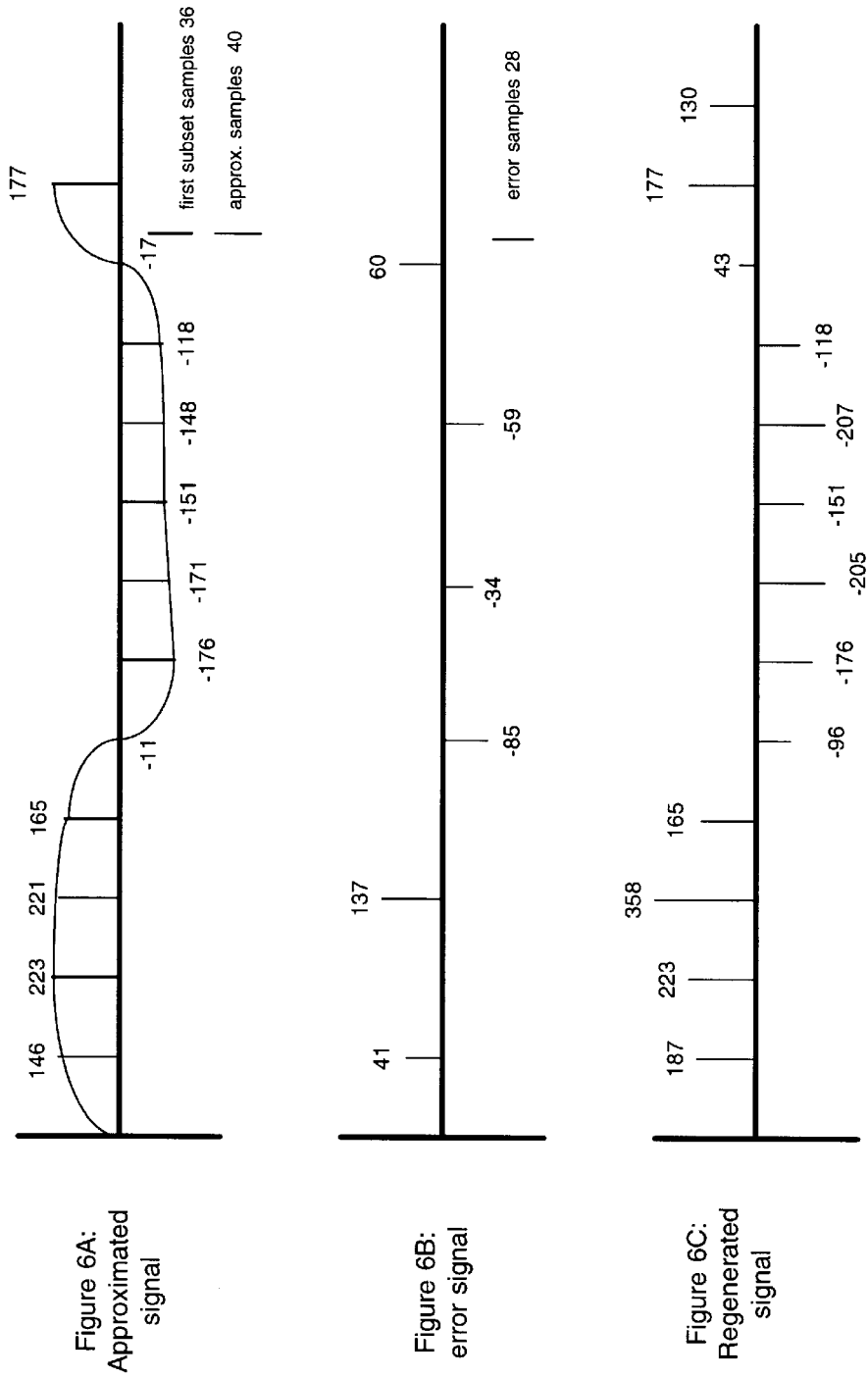
Figure 6: Signal Regeneration

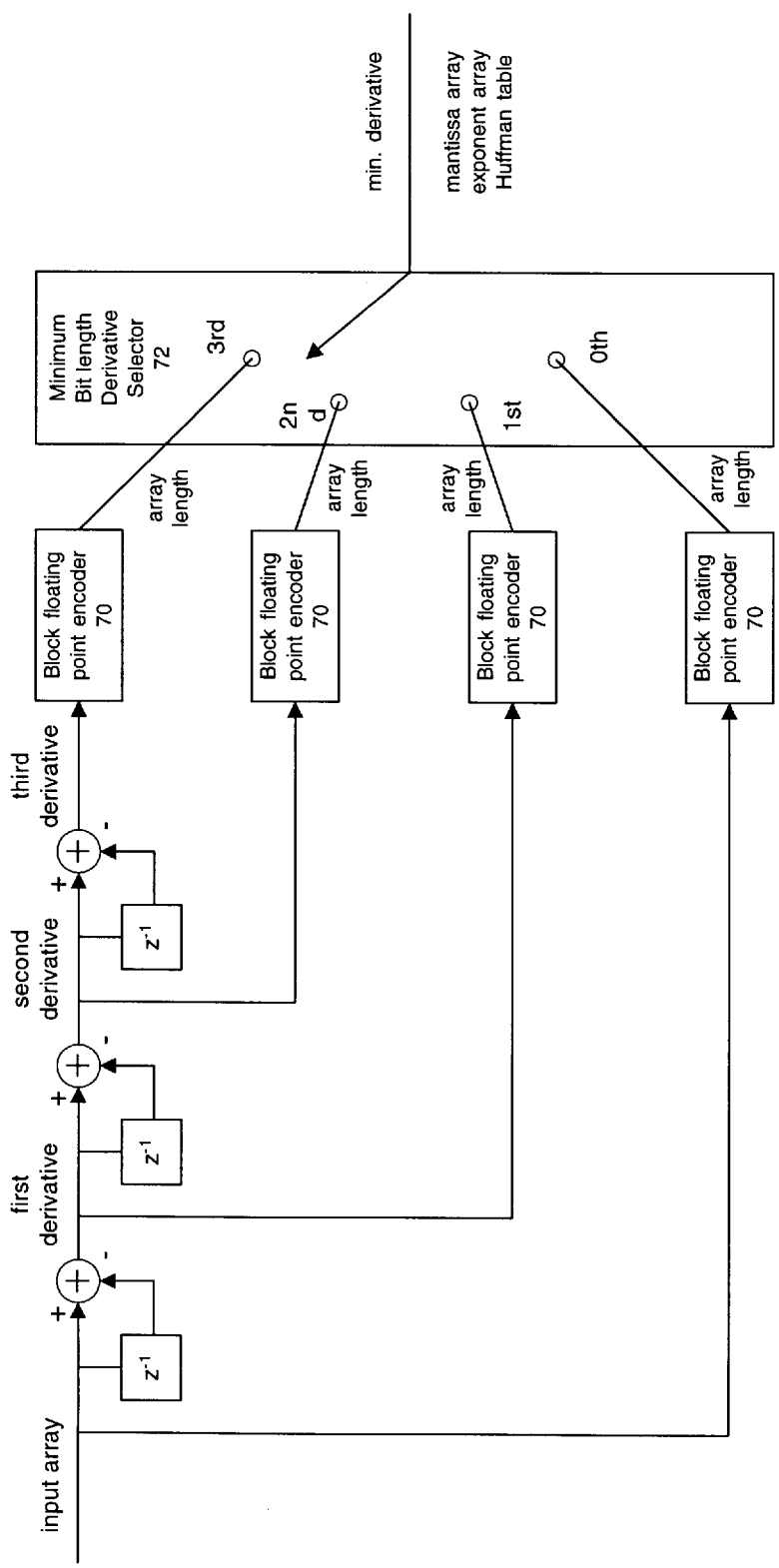
Figure 7: Derivative Encoder

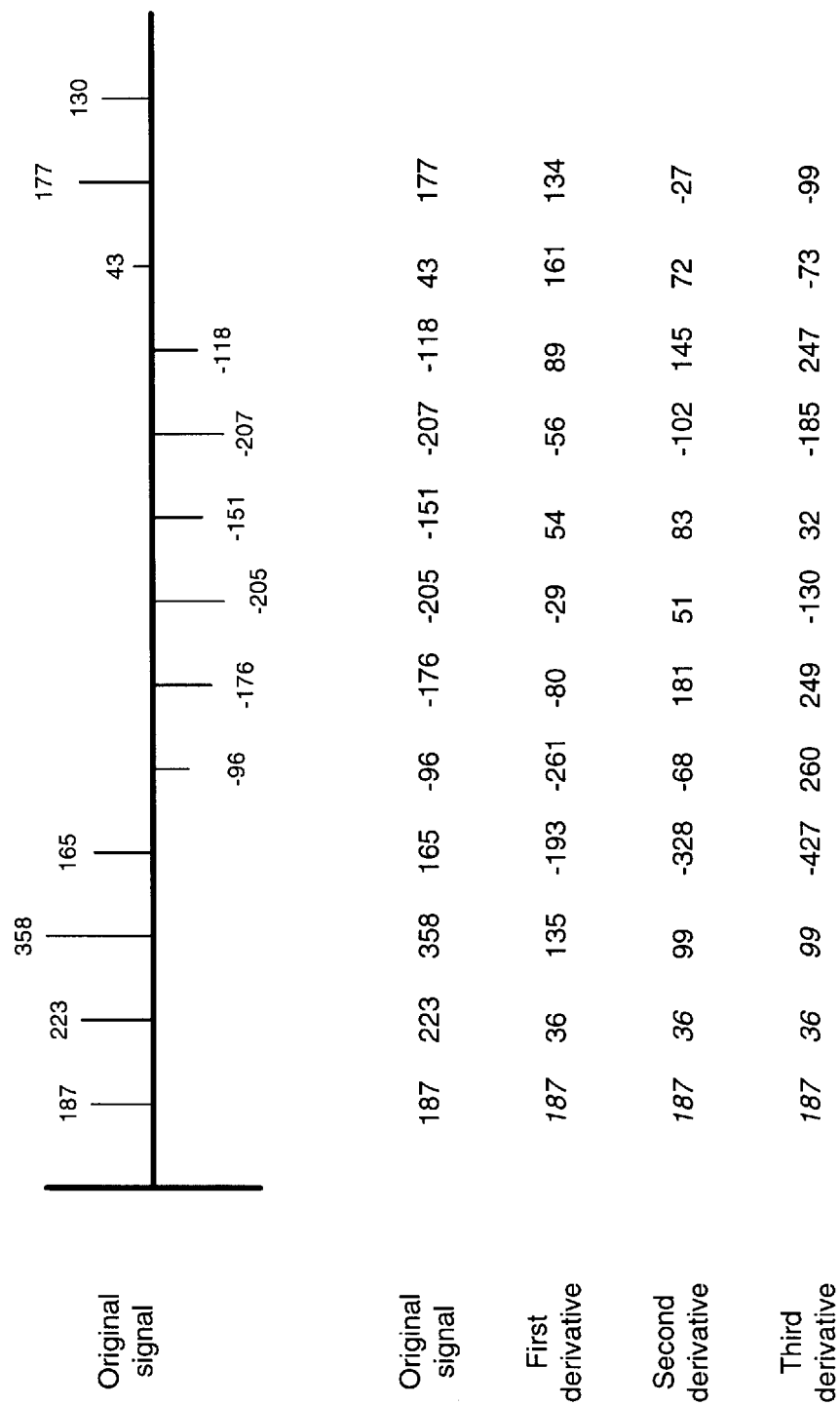
Figure 8: Derivative Calculations

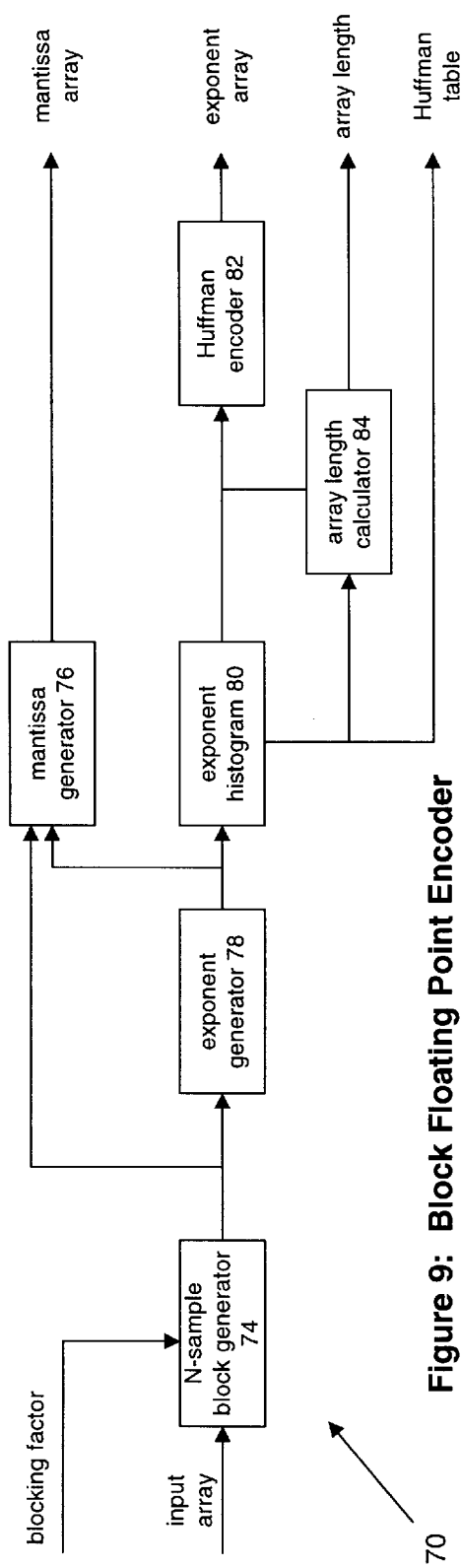
Figure 9: Block Floating Point Encoder
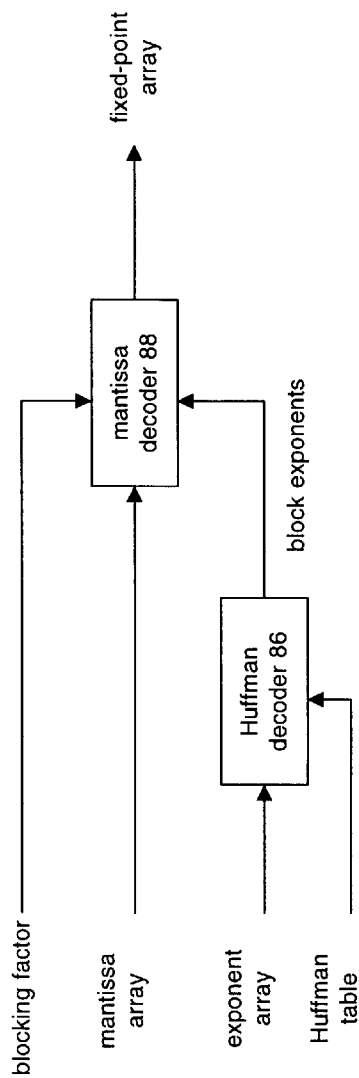
Figure 13: Block Floating Point Decoder

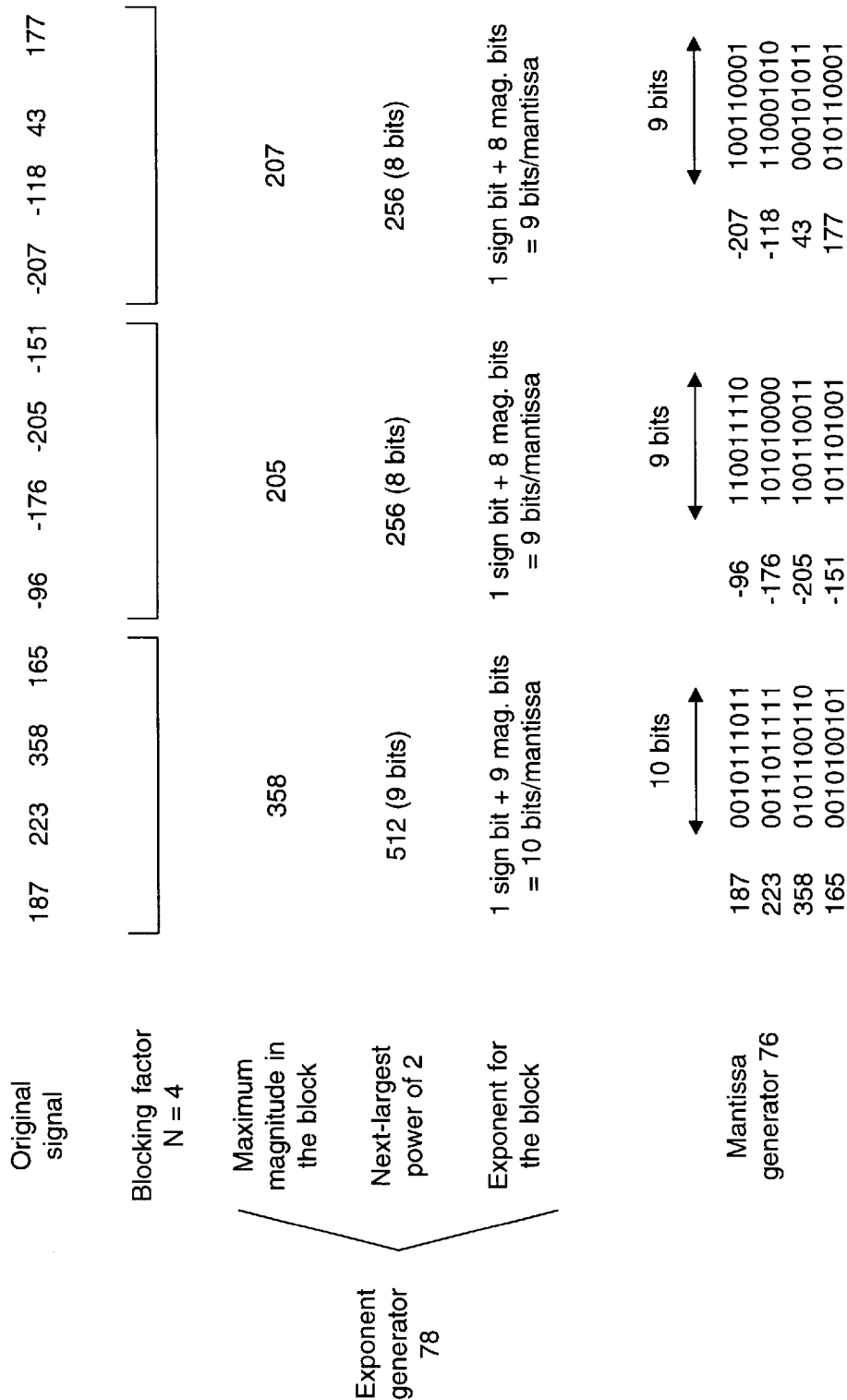
Figure 10: Block Floating Point Encoder Calculations

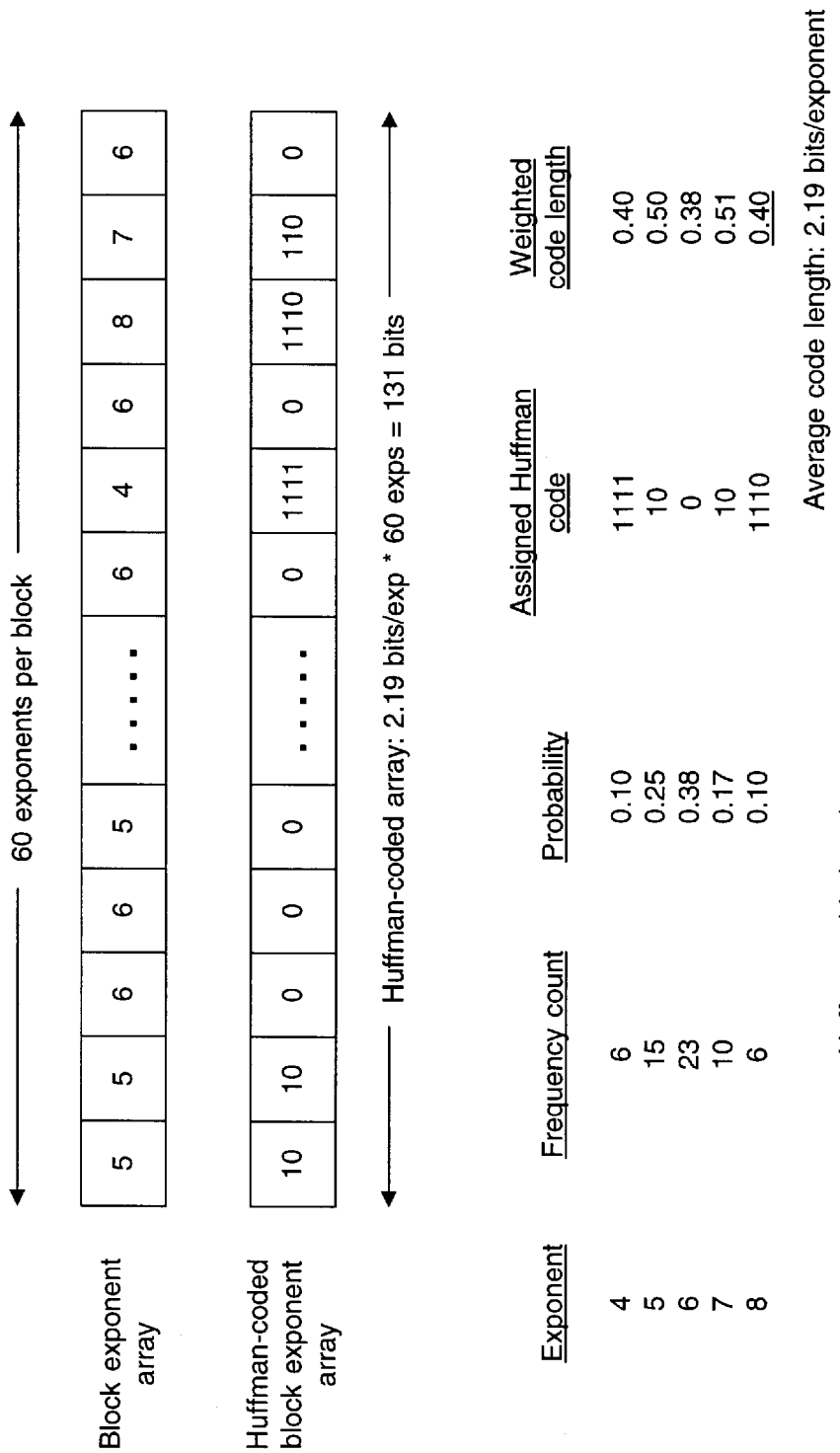
Figure 11: Huffman Exponent Encoding Example

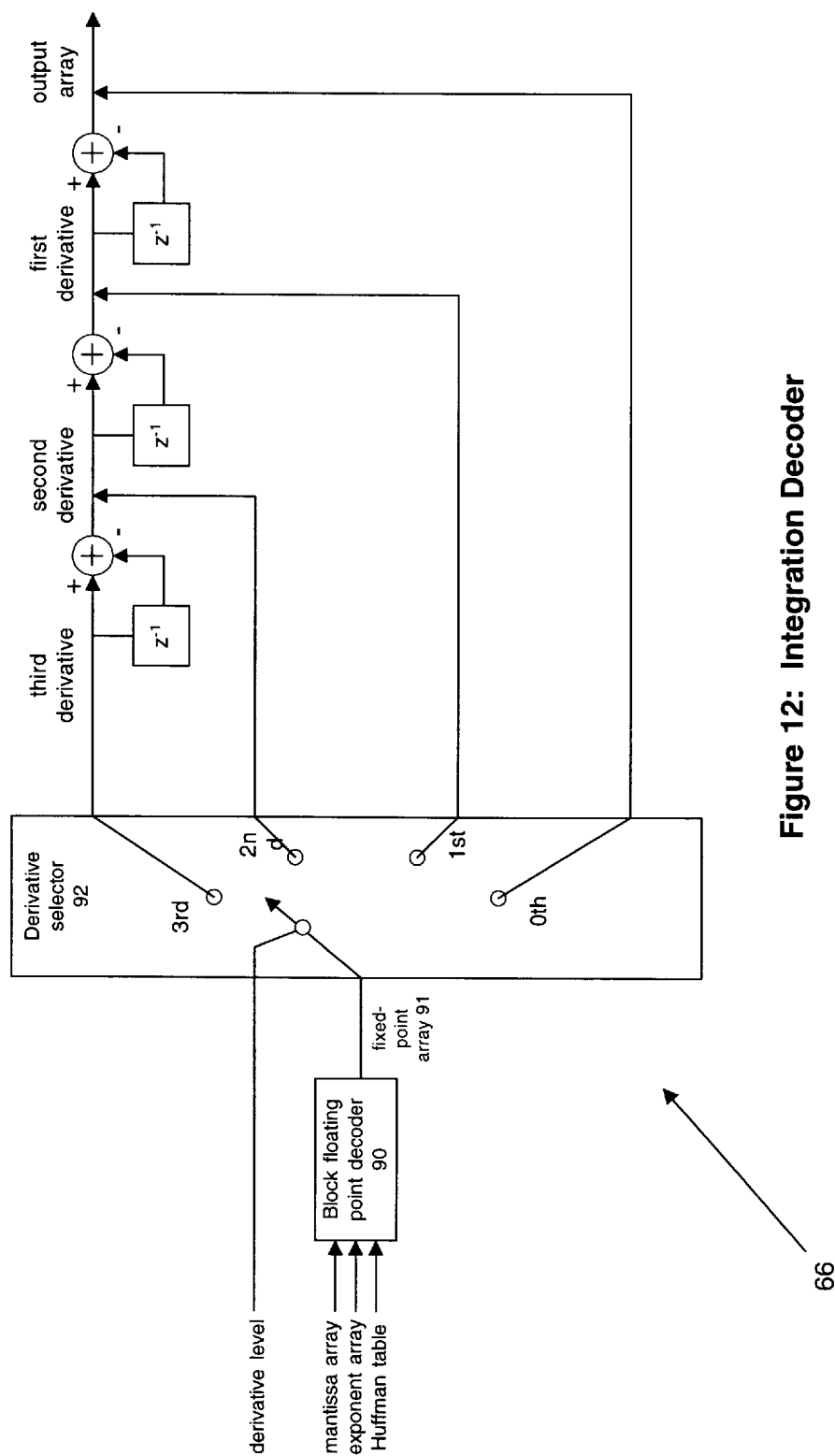
Figure 12: Integration Decoder

| CATEGORY | PARAMETER | NUMBER OF BITS |
|---|---|---|
| GENERAL | Number of samples per block | 4 |
| | Lossy compression shift factor | 4 |
| | Subset partitioning method | 4 |
| | Interpolation method | 4 |
| SUBSET HEADER | Derivative level | 2 |
| | Blocking factor | 2 |
| | Huffman table length | 4 |
| | Huffman table | 0..64 |
| ERROR HEADER | Derivative level | 2 |
| | Blocking factor | 2 |
| | Huffman table length | 4 |
| | Huffman table | 0..64 |
| SUBSET ARRAYS | Huffman-coded exponent array | N1 |
| | Variable bit length mantissa array | N2 |
| ERROR ARRAYS | Huffman-coded exponent array | N3 |
| | Variable bit length mantissa array | N4 |

Figure 14: Format of Compressed Blocks

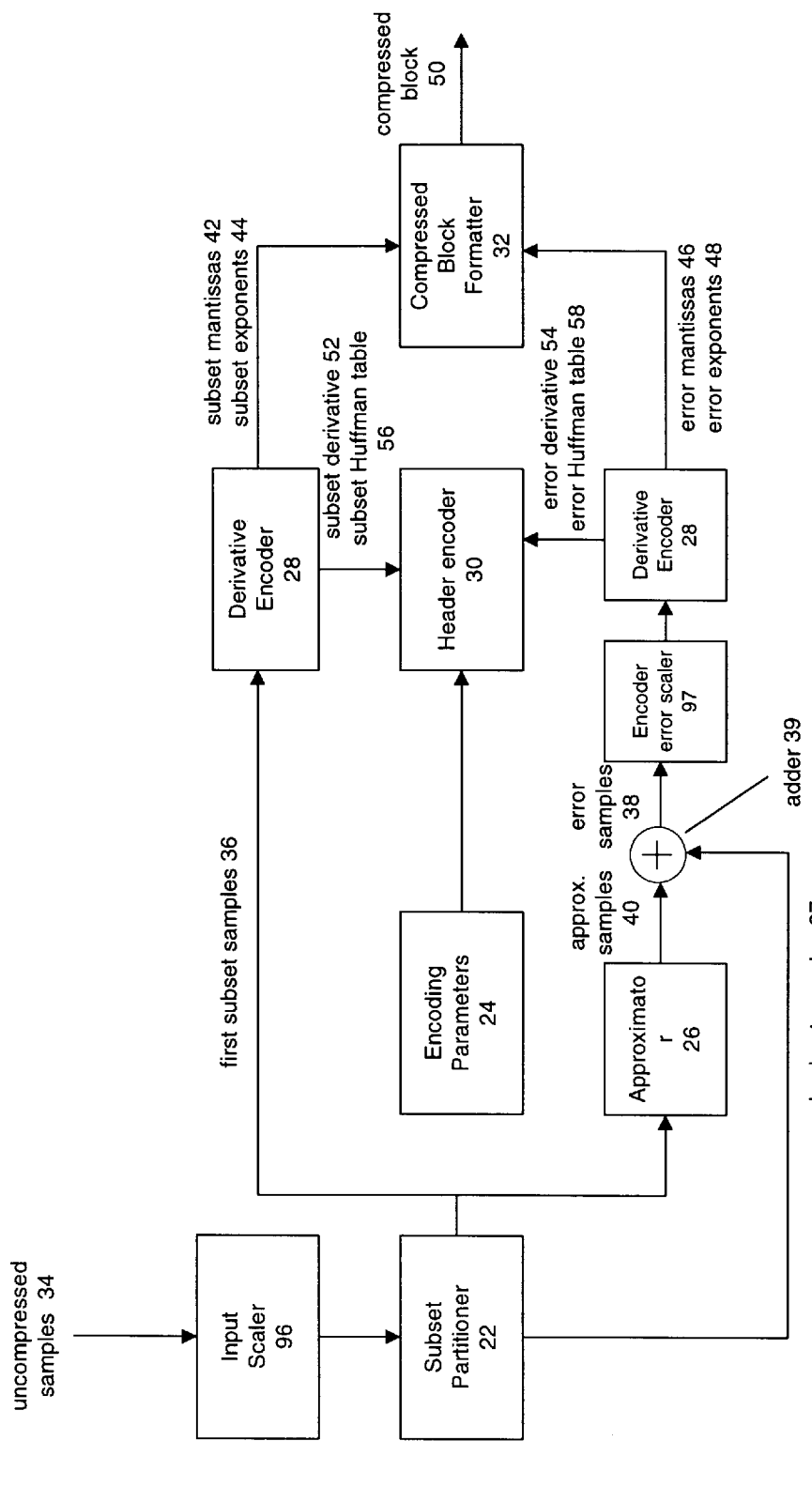
Figure 15: Lossy Encoder Diagram

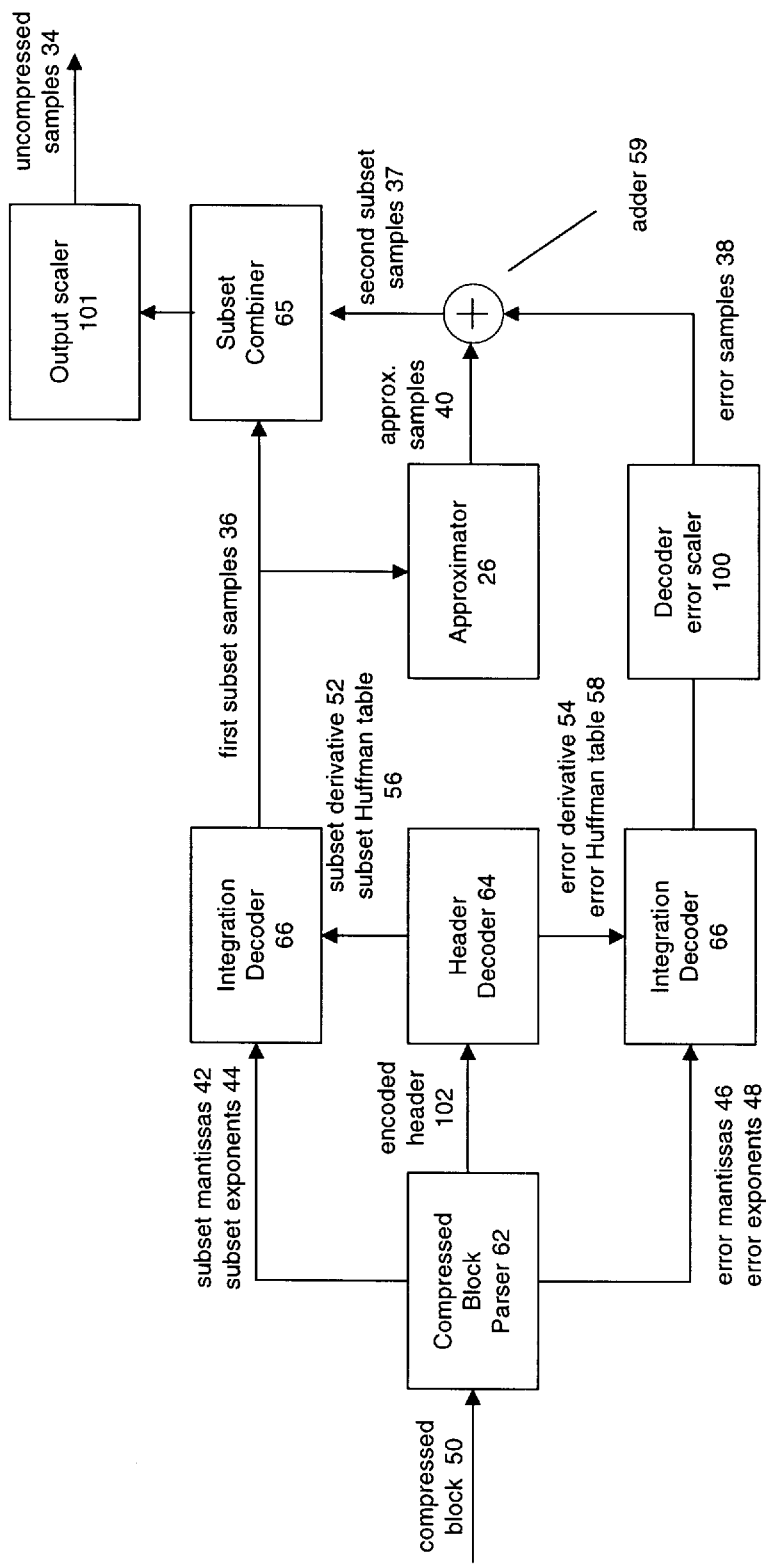
Figure 16: Lossy Decoder Diagram

| START TIME (SEC) | INDEX ENTRY (# OF SECTORS) | START SECTOR | END SECTOR |
|---|---|---|---|
| 0.0 | 67 | 0 | 66 |
| 1.0 | 76 | 67 | 142 |
| 2.0 | 61 | 143 | 203 |
| 3.0 | 64 | 204 | 267 |
| 4.0 | 75 | 268 | 342 |
| 5.0 | 73 | 343 | 415 |
| 6.0 | 65 | 416 | 480 |
| 7.0 | 76 | 481 | 556 |

Figure 17: Indexing Method for Compressed Files

LOSSLESS AND LOSS-LIMITED COMPRESSION OF SAMPLED DATA SIGNALS

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

1.0 BACKGROUND —FIELD OF INVENTION

This invention relates to the compression of sampled data signals, especially the compression of sampled audio, music, and speech waveforms.

2.0 BACKGROUND —DISCUSSION OF PRIOR ART

A common goal in sampled data systems is to minimize the representation of the signal being sampled. In minimizing the representation, two related results are achieved: a) the amount of storage required for the signal is minimized, and b) the bandwidth required for transmitting the signal is decreased. Recently, the rapidly increasing amount of sampled audio and video signals in computer systems has increased the potential benefits of minimizing the representation of such signals. Sampled audio signals consume significant amounts of memory for relatively short amounts of recorded audio. For this reason, a smaller representation of a sampled audio signal translates directly into a cost savings, decreasing either the amount of memory required to store the signal or the time required to transmit the signal from one location to another.

The most commonly used algorithms for compressing audio or video signals are lossy algorithms. Lossy compression replaces the original audio or video signal with an approximation of the signal which requires less storage. Lossy audio and video compression methods take advantage of the limitations of the human auditory and visual processing systems. Both the human ear and eye have well-known bandwidth restrictions. Lossy compression methods exploit these restrictions and can thus selectively remove parts of the original signal representation with little perceived degradation. Lossy compression methods are sometimes acceptable in computer systems when the fidelity of the video and audio signals is limited by the resolution of the computer monitor or the sampling rate of the computer's audio subsystem.

Lossy audio and video compression techniques typically require significant signal processing to achieve their high compression ratios. For instance, the lossy MPEG video and audio compression algorithms often require special signal processing hardware to compress and decompress a signal stream. While decompression of lossy-compressed signals in computers can sometimes be performed without such special hardware, real-time lossy audio and video compression almost always requires special hardware support. This hardware acceleration adds to the cost of the computer system, which is a drawback to lossy compression.

There are applications where the approximations introduced by lossy compression methods are unacceptable. For example, in medical imaging applications, the fuzziness introduced by lossy image compression methods can remove details which are crucial for a correct diagnosis. In audio applications, especially in the fields of professional audio post-production and archiving, lossy audio compression techniques introduce unacceptable artifacts. This is especially true when multiple, lossy compression algorithms are cascaded in the different audio processing steps—initial recording (also called acquisition), editing, mixing, and distribution. When using such lossy audio or video compression algorithms in post-production, extreme care must be taken so that multiple applications of lossy compression methods do not occur, since the repeated application of lossy compression algorithms eventually results in audible or visible distortion. This is true whether the same lossy algorithm is applied several times or different lossy algorithms are applied in sequence to an audio or video signal. Prior art lossy compression methods include U.S. Pat. No. 4,546,342 to Weaver (1985), U.S. Pat. No. 5,083,310 to Drory (1992), U.S. Pat. No. 5,142,656 to Fielder et al (1992), and U.S. Pat. No. 5,394,508 to Lim (1995).

There is another class of compression algorithms which were developed to compress the text, spreadsheet, and program (application) files typically found on computers. Algorithms which compress these kinds of files are of necessity lossless. They exactly re-create the original file from its compressed version. For these kinds of files, even a single error in the re-creation of the original file from its compressed version would be catastrophic—an uncompressed file simply would not be processed or interpreted correctly if it did not exactly match the original file. U.S. Pat. No. 4,558,302 to Welch (1985) is a well-known, prior art lossless data compression method.

Computer files containing text, spreadsheets, or programs can be compressed effectively through lossless data compression methods which exploit the statistical properties of such files. In a text file, for instance, the likelihood of the letter "q" being followed by the letter "u" for English text approaches 100%. The statistical characteristics of common computer files are exploited by lossless data compression algorithms which reduce the storage required to represent the files. Unfortunately, the statistical properties of such computer files differ significantly from those computer files which contain sampled audio or video. For this reason, lossless data compression algorithms designed for text, spreadsheet, or program files which are applied to sampled audio or video signals typically result in little or no reduction in storage. Sampled data signals do contain redundancies, but existing lossless data compression algorithms are not designed to detect or to exploit the redundancies specific to such signals.

Another drawback of lossless data compression methods intended for typical computer files is that they are not designed to run in real time. For audio and video signals, "real time" is defined as requiring less processing time to compress or to decompress the signal than the duration of the signal. The amount of processing required to effectively compress computer files containing text, spreadsheets, or programs is significant. Even if acceptable compression ratios could be achieved on audio or video files by these data compression methods, they would in all likelihood not run in real time as defined above.

Finally, lossless data compression methods for typical computer files process these files in their entirety. In contrast, computer audio or video files (sampled data signals) are often edited after their initial acquisition, which means that only a subset of the files may be accessed during editing. For this reason, existing lossless data compression algorithms are not appropriate for sampled audio or video, where it is common to access only a specific part of the original audio or video file.

To summarize, existing lossy methods for sampled data audio and video compression suffer from the following disadvantages:

a) they do not identically re-create the original sampled data signal,
b) they require additional signal processing apparatus to effect the desired compression,
c) they introduce unacceptable distortion in the uncompressed signal,
d) repeated application of a single lossy compression method increasingly degrades signal quality, and
e) sequential application of multiple lossy methods also increasingly degrades signal quality.

Existing lossless methods for compressing typical computer files (such as text, spreadsheets, or programs) suffer from the following disadvantages:

a) they do not provide significant compression for audio or video files,
b) they are not designed to run in real time,
c) they do not exploit the redundancies present in audio or video signals, and
d) they do not support random access to a specific part of the original audio or video file.

3.0 OBJECTS AND ADVANTAGES

There is an increasing need for an algorithm which allows identical reconstruction of a sampled data signal from its compressed representation, where the compressed representation requires significantly less storage than the original sampled data signal. It is appreciated that the lossless compression and decompression method of the present invention fulfills these requirements. Furthermore, the present invention requires only a moderate amount of computer processing to realize the desired lossless compression, allowing the recording and playback of lossless-compressed audio signals in real time on commonly available personal computers, using only their built-in microprocessor and its associated resources.

Accordingly, several objects and advantages of the present invention are:

a) to provide identical reconstruction of sampled data signals, especially digital audio signals, from their compressed representation,
b) to provide a significant decrease in the storage requirements of the compressed signal when compared to the storage required for the original signal,
c) to remove the redundancies found in sampled data signals, especially digital audio signals,
d) to provide a data compression/decompression method whose repeated application (compression followed by decompression) introduces no distortion whatsoever to the original signal, regardless of the number of applications,
e) to provide an efficient, lossless compression and decompression method which can compress and decompress audio files in real time using only the microprocessor of a computer system,
f) to provide a mechanism whereby arbitrary sections of the original signal can be accessed from their compressed representation, and
g) to provide a lossy method of sampled data compression, especially for digital audio signals, based upon the aforementioned lossless compression method, which allows a tradeoff between storage space and audio quality.

Further objects and advantages of my invention will become apparent from a consideration of the drawings and ensuing description.

4.0 SUMMARY

In a sampled data compression and sampled data decompression system, the present invention uses a subset selection method which partitions the sampled data signal to be compressed into a first subset and a second subset. The first subset is processed by an approximator, which creates an approximation to the samples in the second subset. The approximated signal is subtracted from the second subset, creating an error array. The first subset and the error array are adaptively compressed using a block floating point representation. The compressed first subset and compressed error arrays are combined with a header which contains the compression parameters for the current compressed block.

The decompression method first extracts the compression parameters from the compressed block header. The decompression method then recovers the first subset array and the error array from their compressed representations, under the control of the compression parameters. The recovered first subset array is processed by the same approximator used during compression to create an approximated second subset. This approximated second subset is added to the recovered error array to create the recovered second subset. The recovered first subset and recovered second subset are combined to recreate one uncompressed block from the original stream of sampled data. The recovered uncompressed block is identical to the original block from the stream of sampled data.

5.0 DESCRIPTION OF DRAWINGS

In the drawings, closely related figures have the same number but different alphabetic suffixes.

FIG. 1 shows an overview of the lossless sampled data encoder, which compresses an input block of sampled data into a smaller, compressed output block.

FIG. 2 shows an overview of the lossless sampled data decoder, which converts a compressed input block into a larger, uncompressed block of sampled data.

FIGS. 3A to 3C show three methods for partitioning a sampled data signal into a first and second subset.

FIGS. 4A to 4B show two methods for approximating the "second subset" samples (those samples not included in the "first subset").

FIGS. 5A to 5C show the generation of an error array from the second subset samples and the approximated second subset array.

FIGS. 6A to 6C show the lossless decoder's regeneration of the original sampled data signal by combining the first subset array, the approximated second subset array, and the error array.

FIG. 7 shows the derivative encoder, part of the encoder of FIG. 1.

FIG. 8 shows the calculation of a signal's the first, second, and third derivatives.

FIG. 9 shows the block floating point encoder, which converts a fixed-point signal array into mantissa and exponent arrays.

FIG. 10 shows the creation of a signal's mantissa and exponent arrays by the block floating point encoder.

FIG. 11 shows the use of a histogram of signal exponents in the conversion of an exponent array into a Huffman-encoded exponent array.

FIG. 12 shows the integration decoder, part of the decoder of FIG. 2.

FIG. 13 shows the block floating point decoder, which converts a signal's mantissa and exponent arrays into a fixed-point signal array.

FIG. 14 shows the format of each compressed block, demonstrating one possible ordering of parameters and bit allocation for each field in the block.

FIG. 15 shows a block diagram of the lossy encoder, a modification of the lossless encoder of FIG. 1.

FIG. 16 shows a block diagram of the lossy decoder, a modification of the lossless decoder of FIG. 2.

FIG. 17 shows the creation of an index by the lossless encoder to support random access to any part of a variable-compression-ratio-compressed file.

6.0 LIST OF REFERENCE NUMERALS 20 encoder
22 subset partitioner
24 encoding parameters
26 approximator
28 derivative encoder
30 header encoder
32 compressed block formatter
34 uncompressed samples
36 first subset samples
37 second subset samples
38 error samples
39 adder
40 approximation samples
42 subset mantissas
44 subset block exponents
46 error mantissas
48 error block exponents
50 compressed block
52 subset derivative
54 error derivative
56 subset Huffman table
58 error Huffman table
59 adder
60 decoder
62 compressed block parser
64 header decoder
65 subset combiner
66 integration decoder
70 block floating point encoder
72 minimum bit length derivative selector
74 N-sample block generator
76 mantissa generator
78 exponent generator
80 exponent histogram
82 Huffman encoder
84 array length calculator
86 Huffman decoder
88 mantissa decoder
90 block floating point decoder
91 fixed-point array
92 derivative selector
94 lossy encoder
96 input scaler
97 encoder error scaler
98 lossy decoder
100 decoder error scaler
101 output scaler
102 encoded header

7.0 DETAILED DESCRIPTION OF INVENTION

An efficient, lossless compression method for audio, speech, video, and other sampled data signals is described. In the following description numerous specific details are presented in order to provide a thorough understanding of the present invention. It will be obvious, however, to one skilled in the art that the present invention may be practiced without these specific details. In other instances, well-known methods are not described in detail in order not to unnecessarily obscure the description of the present invention.

FIGS. 1 and 2 demonstrate the components and operation of a lossless sampled data encoder and decoder, respectively. In the preferred embodiment of the present invention, the processes described in FIGS. 1 and 2 are performed on a computer, specifically by the central processing unit (CPU) of the computer. The invention described below can also be implemented by special-purpose processors, such as Digital Signal Processors (DSPs), discrete components (adders, subtractors, multipliers, shift registers, etc.), or by application-specific integrated circuits (ASICs). These special-purpose processors may reside in a computer, or they may alternately reside in a transmission network or in a storage device. In actual practice, the present invention uses the CPU of a computer so efficiently that real-time performance is achievable, requiring no special hardware acceleration to implement the present invention in a computer. The term "real time" means that sampled data signals can be compressed or decompressed by the CPU implementing the present invention at least as quickly as samples, or blocks of samples, arrive at the processor.

FIG. 1 demonstrates the operation of a lossless sample data encoder 20. A source (not shown) of uncompressed samples 34 is provided to encoder 20. This source of uncompressed samples 34 can be a real-time sampling device, such as an analog-to-digital conversion board, a storage device such as a computer disk drive, a transmission medium such as a computer or telephone network, or a direct source of audio samples, such as a compact disc (CD) player or digital audio tape (DAT) player. A subset partitioner 22 partitions the uncompressed samples according to one of several methods, generating an array of first subset samples 36 and an array of second subset samples 37. Three subset partitioning methods are shown in FIGS. 3A through 3C, which are discussed in detail later in later paragraphs. In the preferred embodiment, decimation (selecting every Nth sample, where N is an integer greater than 1) is used as the selection method. Second subset samples 37 are those samples which remain after first subset samples 36 are removed from the array of uncompressed samples 34. First subset samples 36 are passed to a first derivative encoder 28. (Note: "first" derivative encoder 28 refers to the fact that there are two derivative encoders in shown in FIG. 1, not that encoder 28 only takes the first derivative of its input signal). The purpose of derivative encoder 28 is to choose that derivative of its input signal which requires the fewest bits to encode in a block floating point format. The block floating point operations performed in the derivative encoder are described in detail in FIG. 9. Derivative encoder 28 generates four output parameters: an array of subset mantissas 42, an array of subset exponents 44, a subset derivative 52, and a subset Huffman table 56.

First subset samples 36 are also passed to an approximator 26. Approximator 26 uses the subset samples and (in the preferred embodiment) a Bessel approximation method to create an array of approximation samples 40, which approximate second subset samples 37. FIGS. 4A and 4B, described in later paragraphs, demonstrate two methods of approximating non-subset samples. Approximation samples 40 are subtracted from second subset samples 37 by adder 39, creating an array of error samples 38. Error samples 38 are passed to a second derivative encoder 28, which creates four output parameters: an array of error mantissas 46, an array of error exponents 48, an error derivative 54, and an error Huffman table 58. (Note: "second" derivative encoder 28 refers to the fact that there are two derivative encoders in shown in FIG. 1, not that encoder 28 only takes the second derivative of its input signal). The lossless encoding algorithm is controlled by a set of encoding parameters 24, which are encoded along with subset derivative 52, subset Huffman table 56, error derivative 54, and error Huffman table 58 by a header encoder 30. The purpose of header encoder 30 is to create an encoded header 102 containing the encoding parameters at the beginning of a compressed block 50. The preferred embodiment's encoding parameters 24, described in later paragraphs, are listed in FIG. 14. Finally, a compressed block formatter 32 combines encoded header 102, subset mantissas 42, subset exponents 44, error mantissas 46, and error exponents 48 into compressed block 50. This compressed block 50, of smaller size than the original array of uncompressed samples 34, can then either be transmitted over a network (not shown) or stored in a storage device (not shown).

FIG. 2 demonstrates the operation of a lossless sampled data decoder 60. A source (not shown) of compressed blocks 50 is provided to decoder 60. This source of compressed blocks 50 can be a computer network or a storage device such as a computer disk drive. A compressed block parser 62 separates compressed block 50 into encoded header 102, an array of subset mantissas 42, an array of subset exponents 44, an array of error mantissas 46, and an array of error exponents 48. A header decoder 64 extracts the decoding parameters from encoded header 102. The decoding parameters include subset derivative 52, subset Huffman table 56, error derivative 54, and error Huffman table 58, along with additional encoding parameters (not shown in FIG. 2) listed in FIG. 14. A first integration decoder 66 converts an array of subset mantissas 42 and an array of subset exponents 44 into an array of first subset samples 36. A second integration decoder 66 converts an array of error mantissas 46 and an array of error exponents 48 into an array of error samples 38. Approximator 46 uses first subset samples 36 and (in the preferred embodiment) a Bessel approximation method to create an array of approximation samples 40. Approximation samples 40 are combined by adder 59 with error samples 38 to create an array of second subset samples 37. A subset combiner 65 combines first subset samples 36 and second subset samples 37 into one block of uncompressed samples 34 of the original sampled data signal.

FIG. 3 demonstrates three possible methods of selecting first subset samples 36 from an array of uncompressed samples 34. In FIG. 3A, an array of first subset samples 36 is created by selecting every other sample of uncompressed samples 34. This method is called "decimation by 2," since every second sample is selected for the subset array. FIG. 3B demonstrates decimation by 3, where every third sample of uncompressed samples 34 is used in the first subset array. FIG. 3C demonstrates a non-regular subset selection method, where the largest magnitude sample in every group of four consecutive samples is selected for the subset array. It is to be appreciated that there are many methods for selecting first subset samples 36 from an array of uncompressed samples 34. The present invention is not limited to any subset selection method, but rather can operate with any subset selection method. The particular subset selection method used for a given compressed block 50 is specified in the block's encoded header 102, thus allowing the subset selection method to be adaptively chosen from several methods (the chosen method resulting in the smallest compressed block 50). In the preferred embodiment, decimation by N is used as the subset selection method because it is the most simple to implement. Several integer decimation values are tried by subset partitioner 22 and the best one (that resulting in the shortest compressed block 50) is encoded in encoded header 102. Adapting the decimation rate to each block of uncompressed samples 34 allows maximum flexibility in choosing the optimal decimation parameter N for each compressed block. As shown in FIG. 14 (discussed below), the subset partitioning method is specified in encoded header 102 of each compressed block 50.

FIG. 4 demonstrates two possible methods for approximating second subset samples 37 using first subset samples 36. The example of FIG. 4 uses the subset samples shown in FIG. 3A, where decimation by 2 is used as the subset partitioning method. FIG. 4A demonstrates how linear approximation is used to approximate non-subset samples. FIG. 4B demonstrates how Bessel approximation is used to approximate non-subset samples.

It is to be appreciated that there are many methods for approximating second subset samples using the first subset samples as input to the approximation method. In the literature these approximation methods are also called interpolation methods. A particular second subset sample is approximated using a weighted average of the N first subset samples surrounding the location of the particular second subset sample, where N is often called the order of the approximation or interpolation method. The present invention is not limited to any approximation or interpolation method, but rather can operate with any approximation or interpolation method. In the preferred embodiment, Bessel approximation or interpolation is used because it provides the best compromise between computational efficiency and goodness of approximation.

Approximation methods are characterized by the order of the approximation N and by a position factor p. The order of the approximation specifies how many first subset samples N are used in the calculation of each approximated second subset sample. The position factor p (between 0.0 and 1.0) specifies the position of the approximated second subset sample relative to the closest first subset samples x(i) and x(i+1). In other words, the second subset sample y(i) to be approximated is bordered by x(i) on the left and by x(i+1) on the right. A position factor p=0.0 results in y(i)=x(i), while a position factor p=1.0 results in y(i)=x(i+1).

The position factor p is related to the decimation ratio D used in the subset partitioning method which creates the first and second subset arrays. For example, a decimation ratio of D=2 (every other input sample belongs to the first subset) uses p=0.5 to approximate the one second subset value removed by the decimation process. A decimation ratio of D=3 (every third input sample belongs to the first subset) uses p=0.333 and p=0.666 to approximate the two second subset values removed by the decimation process. For a given decimation ratio D, D−1 p values from the set { 1/D, 2/D, . . . , (D−1)/D} are used to approximate the (D−1) second subset values removed by the decimation process.

Given the aforementioned definitions of N, D, and p, Bessel approximation for a decimation ratio of D=2 is defined as follows:

N=4[use 4 first subset values x(i−1), x(i), x(i+1), and x(i+2) in the Bessel approximation, where x(i) and x(i+1) surround the approximated y(i)]

p=0.5 y(i)=[−x(i−1)+9x(i)+9x(i+1)−x(i+2)]/16

Cubic interpolation is also effective as an approximation method. Given the aforementioned definitions of N, D, and p, cubic interpolation is defined as follows:

N=4[use 4 first subset values x(i−1), x(i), x(i+1), and x(i+2) in the cubic approximation, where x(i) and x(i+1) surround the approximated y(i)]

p={1/D, 2/D, . . . , (D−1)/D}

$w_3$=(x(i+2)−3x(i+1)+3x(i)−x(i−1))/2

$w_2$=(−x(i+2)+4x(i+1)−5x(i)+2x(i−1))/2

$w_1$=(x(i+1)−x(i−1))/2

$w_0$=x(i)

y(i)=$w_3 * p^3 + w_2 * p^2 + w_1 * p + w_0$

The specific approximation method used (Bessel, cubic, linear, or other) is specified in encoded header 102 of each block of compressed samples 50, allowing the approximation method to be adapted for each compressed block according to which method works best, i.e. the one which results in the smallest compressed block 50.

FIG. 5 demonstrates how error samples 38 are generated by subtracting approximation samples 40 from second subset samples 37. FIG. 5A demonstrates an array of uncompressed samples 34. In FIG. 5B, first subset samples 36 are indicated with thick lines, while approximation samples 40 are indicated with thin lines. In this example, the first subset samples are chosen using the "decimate by 2" method, while the approximation samples are created using Bessel approximation applied to the first subset samples. Error samples 28 in FIG. 5C are created by subtracting approximation samples 40 of FIG. 5B from second subset samples 37 of FIG. 5A. In FIG. 1, this subtraction is performed by adder 39.

FIG. 6 demonstrates how uncompressed samples 34 are regenerated by adder 59 and subset combiner 65 shown in FIG. 2. In FIG. 6A, first subset samples 36 are used by a Bessel approximation method to create approximated samples 40. FIG. 6B shows the recovered error samples 28. FIG. 6C demonstrates that the original uncompressed samples 34 are regenerated by adding error samples 28 of FIG. 6B to approximation samples 40 of FIG. 6A. In FIG. 2, this addition is performed by adder 59.

FIG. 7 demonstrates derivative encoder 28. Derivative encoder 28 applies a block floating point encoder 70 to the derivative encoder's input signal and also to various derivatives of the input signal. The derivative encoder then selects that derivative (or the input signal itself) which requires the least amount of storage for a block floating point representation. In the preferred embodiment, only the first, second, and third derivatives are used. In FIG. 7, the original signal and its first, second, and third derivatives are each submitted to separate block floating point encoders 70. Each block floating point encoder 70 creates three output arrays (a mantissa array, an exponent array, and a Huffman table). Each block floating point encoder 70 also returns the array length required to encode these three output arrays (labeled "array length" in FIG. 7). A minimum bit length derivative selector 72 chooses the minimum array length from among the block-floating-point-encoded original signal and its first, second, and third derivatives. Whichever block floating point encoder 70 requires the fewest bits for its mantissa array and exponent array is selected by derivative selector 72. The derivative encoder's selected mantissa and exponent arrays are passed to compressed block formatter 32 in FIG. 1, while the Huffman table and minimum derivative level are passed to header encoder 30 in FIG. 1.

FIG. 8 provides a numerical example of the first, second, and third derivative calculations for an array with M=12 elements. Given an input array x containing M samples, the array's $n^{th}$ derivative $x_n$ (n>0) is calculated by the following equation:

$x_n(i) = x_{n-1}(i) - x_{n-1}(i-1)$, i=n . . . M

In FIG. 8, the values in italics simply indicate that, for the $n^{th}$ derivative, its first n elements are unchanged from the previous derivative.

FIG. 9 demonstrates the operation of block floating point encoder 70. FIG. 10 provides a numerical example of block floating point encoder calculations. FIGS. 9 and 10 will be discussed together. The purpose of block floating point encoder 70 is to convert an input array of fixed-point samples into two output arrays, which contain a) encoded block exponents and b) encoded mantissas which have a common exponent for each group of N consecutive mantissas, where N is the blocking factor. The exponent and mantissa arrays can be represented with fewer bits than those required for the original fixed-point input array while still maintaining the equivalent precision of the original fixed-point input array. Block floating point encoder 70 provides data reduction.

In FIG. 9, the input array to block floating point encoder 70 is first processed by an N-sample block generator 74. This N-sample block generator is the source of the adjective "block" in the term "block floating point." In FIG. 10, the blocking factor N=4 indicates that each block contains four consecutive input samples. The blocking factor N is varied, and that blocking factor resulting in the shortest combined mantissa and error array length is used to encode the input array. The blocking factor is specified in encoded header 102 of each compressed block 50. In FIG. 9 an exponent generator 78 determines how many bits are required to encode each of the samples in each N-sample block. Exponent generator 78 first calculates the maximum magnitude of each block, ignoring its sign (±). After finding the maximum magnitude, its next-highest power of 2 is calculated. Finally, an additional bit is allocated for the sign bit of each sample in the block. In FIG. 9, exponent generator 78 calculates the exponent for a block of samples x(j) through x(j+3) through the following equation:

expon [x(j+1) . . . x(j+3)]=1+ceil ($\log_2${max[x(j), x(j+1), x(j+2), x(j+3)]})

The "ceil" function (ceiling) takes input value x and returns the next-highest integer i. The "$\log_2$" function (base 2 logarithm) takes input value y and returns its logarithm (base 2). An example of the operation of exponent generator 78 is shown in FIG. 10. A mantissa generator 76 takes each block of N=4 input samples and encodes them using the number of bits specified by the exponent value for that block. The operation of mantissa generator 76 is shown in FIG. 10. The utilization of varying bit lengths for the mantissa values results in data reduction of the mantissa array. This concludes the discussion of FIG. 10.

FIG. 9 and FIG. 11 will now be discussed together. Specifically, the operation of an exponent histogram 80 and a Huffman encoder 82 (both shown in FIG. 9) will be described. A numerical example of the operation of exponent histogram 80 and Huffman encoder 82 is given in FIG. 11.

The block exponent array calculated by exponent generator 78 exhibits statistical properties which are exploited by the present invention to provide data reduction. For an input array which contains n-bit samples, the possible exponent values range from 1 to n. In other words, every sample in the input array to block floating point encoder 70 can be represented using a minimum of 1 bit and a maximum of n bits. For digital audio samples, n is usually 8 or 16. In practice, however, the statistical properties of the block floating point exponents are such that some exponents appear more often than others. The frequency of occurrence of each exponent in the block floating point exponent array is calculated by exponent histogram 80. Huffman encoder 82 assigns shorter codes to frequently occurring exponents and longer codes to less frequently occurring exponents. For example, in FIG. 11, the block exponent value 6 occurs 23 times in the 60-element array of block exponents, while the block exponent value 8 occurs just 6 times. The assignment of shorter codes to frequently occurring block exponents results in data reduction for the exponent array.

In the example shown in FIG. 11, the original block exponent array could have been represented using 4 bits per array entry, since there are at most 16 possible block exponent values (assuming 16-bit input samples to block floating point encoder 70). For the array of 60 exponents shown in FIG. 11, the fixed-point encoded block exponent array requires 4*60=240 bits, or 4 bits per exponent. After calculating the frequency of occurrence of each of the block exponents, FIG. 11 demonstrates that only five of the possible 16 exponent values actually occur in the block exponent array. Furthermore, the frequency of occurrence of these five exponent values varies considerably, from 23 occurrences of exponent 6, as compared to 6 occurrences each of exponents 4 and 8. This statistical difference is exploited by the present invention to reduce the number of bits required to represent the exponent array. The application of a Huffman code to the histogrammed block exponent values in FIG. 11 results in a minimal coding for the block exponents, one which requires just 2.19 bits per array entry in the example of FIG. 11. Compared with the original 4 bits per array entry, we have nearly halved the storage required for the block exponent array in this example.

In order to provide a translation between the assigned Huffman code and its corresponding block exponent value, decoder 60 must know how many different block exponents occur in the Huffman-coded block exponent array, as well as which Huffman code represents a specific block exponent value. In the example shown in FIG. 11, five different exponents occur in the block exponent array, so the Huffman table length is 5 and the Huffman table contains the five ordered entries {6, 5, 7, 8, 4}, ordered from most frequently to least frequently occurring. The Huffman table indicates that block exponent 6 is represented by the shortest Huffman code "0", and that the block exponent 4 is represented by the longest Huffman code "1111". FIG. 1 shows that subset Huffman table 56 and error Huffman table 58 are stored by header encoder 30 in the encoded header 102 of each compressed block 50.

The final operation performed by block floating point encoder 70 is the array length calculation of the combined mantissa and Huffman-encoded exponent arrays. This calculation is performed by an array length calculator 84. Given blocking factor N, a Huffman table length m, a list of block exponents ei and their corresponding frequency of occurrence $f_i$, the length of the mantissa array is calculated as follows:

$$\text{mantissa array length} = N * \sum_{i=1}^{m} e_i * f_i$$

For instance, in the example of FIG. 11, N=4, m=5, $e_i$={4, 5, 6, 7, 8} and $f_i$={6, 15, 23, 10, 6}, so the length of the mantissa array for this example is:

mantissa array length=4*(4*6+5*15+6*23+7*10+8*6)=1420 bits

Given the length of the Huffman codes for the block exponent array $h_i$ and their frequency of occurrence $f_i$, the length of the Huffman-encoded exponent array is calculated as follows:

$$\text{encoded exponent array length} = \sum_{i=1}^{m} h_i * f_i$$

In the example of FIG. 11, m=5, $h_i$={4, 2, 1, 3, 4} and $f_i$={6, 15, 23, 10, 6}, so the encoded exponent array length for this example is:

encoded exponent array length=(4*6+2*15+1*23+3*10+4*6)=131 bits

The total number of bits required to encode the mantissa and exponent arrays is thus 1420+131=1551 bits for the example shown in FIG. 11. This value is returned by array length calculator 84.

FIG. 12 demonstrates the operation of integration decoder 66. A block floating point decoder 90 receives a compressed mantissa array, a Huffman-encoded exponent array, and a Huffman table as input and generates a fixed-point array 91 as output. Fixed-point array 91 may represent the derivative of the integration decoder output signal, so it is routed to the appropriate connection in a derivative selector 92 under the control of the derivative level specified by subset derivative 52 or error derivative 54. As shown in FIG. 2, subset derivative 52 and error derivative 54 are extracted from the header of each compressed block by header decoder 64. During decompression by decoder 60, integration decoder 66 reverses the operations of FIG. 7's derivative encoder 28.

FIG. 13 demonstrates block floating point decoder 90. Using the Huffman table provided by FIG. 2's header decoder 64, a Huffman decoder 86 converts a Huffman-encoded block exponent array (provided by FIG. 2's compressed block parser 62) into an array of fixedpoint block exponents. These fixed-point block exponents specify the number of bits used in each block of N consecutive mantissas in the compressed mantissa array. Using the block exponents from Huffman decoder 86, the mantissa array, and the blocking factor provided by FIG. 2's header decoder 64, a mantissa decoder 88 recovers the original fixed-point array, which is the final output of block floating point decoder 90. During decompression by decoder 60, block floating point decoder 90 reverses the operations of FIG. 9's block floating point encoder 70.

FIG. 14 demonstrates the preferred embodiment's format for all fields in compressed block 50. As discussed previously, the present invention adaptively varies the following parameters:

a) subset partitioning method,
b) interpolation method,
c) subset derivative level,
d) error derivative level,
e) subset blocking factor, and
f) exponent blocking factor and selects that combination of the aforementioned parameters which results in the smallest representation of the input signal. It is to be appreciated by those skilled in the art that other compression control parameters may be added to those listed in FIG. 14 without loss of generality. Alternatively, if certain of these parameters do not vary from block to block, they may be removed from the header of each compressed block, thus providing a higher compression ratio because the bits required to encode these parameters in the header are removed.

FIGS. 15 and 16 present an alternative lossy encoder and decoder based on the lossless compression method described in FIG. 1's encoder 20 and FIG. 2's decoder 60, respectively. FIG. 15 demonstrates a lossy encoder 94, which provides loss-limited compression of an audio signal. FIG. 16 demonstrates the corresponding lossy decoder 98, which reconstructs the loss-limited sampled data signal that was compressed by lossy encoder 94.

The only differences between FIG. 1's lossless encoder 20 and FIG. 15's lossy encoder 94 is the presence of an input scaler 96 and an encoder error scaler 97. Input scaler 96 provides controllable loss of audio quality by allowing the user to specify how many bits of precision are carried in the subsequent encoding process. Decreasing the amplitude of the input samples by 1 bit will decrease the dynamic range of the reconstructed sample array by 6 dB. For a given array of uncompressed samples 34, lossy encoder 94 will always create a smaller compressed block 50 than that generated by lossless encoder 20.

In the preferred embodiment input scaler 96 is a user- or algorithm-controllable right-shift operator which decreases the amplitude of the audio signal by one or more bits. The amount of input scaling is a dynamically alterable parameter which is stored in the header of each compressed block 50. Similarly, the amount of precision carried in the encoding of FIG. 15's error samples 38 is controlled by encoder error scaler 97. Encoder error scaler 97 only affects the encoding precision of error samples 38, while input scaler 96 affects the precision of both first subset samples 36 and error samples 38.

The amount of error allowed by lossy encoder 94 can either be statically specified by the user or dynamically varied by an algorithm during encoding. In this manner the user can either statically or algorithmically control the quality level of the signal provided to lossy decoder 98. An algorithmically selected, dynamically varying quality level is useful when the present invention's lossy encoding process is used to provide a fixed, minimum compression ratio. For instance, if a fixed compression ratio of 4:1 is desired, lossy encoder 94 can be repeatedly invoked with increasingly larger settings for input scaler 96 or encoder error scaler 97 until the desired compression ratio is achieved or exceeded. This method of algorithmically controlled lossy audio encoding (which varies the amount of input scaling) can achieve a user-specified minimum compression ratio. However, this lossy method still results in a variable compression ratio. In this manner lossy decoder 94 can be used in systems which require fixed compression ratios.

FIG. 16 will now be discussed. During decompression, lossy decoder 98 reverses the scaling adjustments performed by lossy encoder 94. Specifically, a decoder error scaler 100 amplifies integration decoder 66's output by one or more bits, thus reversing the effects of FIG. 15's encoder error scaler 97. The specific amount of shifting performed by decoder error scaler 100 is encoded in the header of compressed block 50. Similarly, an output scaler 101 compensates for FIG. 15's input scaler 96. The amount of scaling performed by output scaler 101 is also encoded in the header of compressed block 50. In the preferred embodiment output scaler 101 is a left-shift operator which increases the amplitude of its input signal by one or more bits.

FIG. 17 demonstrates the creation of a directory or index that supports random access into a compressed audio file. This index is created in conjunction with lossless encoder 20 or lossy encoder 94. This index provides random access to any arbitrary sample in the original, uncompressed signal. A difficulty with prior-art, variable-rate encoding systems is that they do not provide random access to arbitrary subsets or positions within a variable-rate compressed file. This drawback has already been mentioned in Section 2, Discussion of Prior Art. By generating an index for the compressed file, the present invention provides fast, random access to specific parts of the uncompressed signal, even though the present invention's compression ratio is variable.

Each compressed block of the present invention represents a fixed number of uncompressed audio samples. Groups of N compressed blocks thus also represents a fixed number of audio samples and (consequently) a fixed amount of time. When the N blocks in each group are uncompressed, they always create the same duration of audio. In the example shown in FIG. 17, an index has been created to provide random access at one-second increments to audio stored in the compressed format of the present invention. Because the compression ratio of the present invention is variable, the storage required for each second of compressed audio will also vary. The index specifies how much storage is required for the varying size of each group of N compressed blocks.

The index into the variable-rate-compressed audio file contains the storage size occupied by each group of N compressed blocks. The size of each group is rounded to the next-largest storage increment of the storage medium before being entered in the directory. For computer disk drives, this storage increment is usually 512 bytes, which is also called a sector. The index shown in FIG. 17 contains a time-ordered list of the number of sectors occupied by each 1-second piece of compressed audio. The index can be traversed by the program which controls decompression to identify the location of a particular audio sample.

In FIG. 17, the directory contains entries which represent 1-second increments of audio. In the example shown in FIG. 17, an average compression ratio of 2.5:1 and a sampling rate of 44,100 samps/sec (mono) are assumed. Using these parameters, the average amount of storage required for one second of compressed audio is:

44,100/[256 samples per sector*2.5 compression ratio]=69 disk sectors.

The audio from t=0.0 sec up to t=1.0 sec is stored in the first 67 disk sectors. The audio from t=1.0 up to t=2.0 is stored in the next 76 disk sectors. In the example shown in FIG. 17, audio from t=5.0 to t=7.0 is recovered by uncompressing disk sectors 343 through 480. It is to be appreciated that this directory creation method can be used for any storage medium, not just computer disk drives, but also DRAM, tape, or CDs containing the variable-length compressed blocks of the present invention.

Although I do not wish to be bound by the following description of the theory of operation behind the present invention, I include it as a possible explanation for the invention's effectiveness at compressing sampled data, especially digital audio signals. As is well known to those skilled in the art, a sampled data system must operate at a sampling rate which is at least twice as high as the highest frequency contained in the signal being sampled. This observation is called the Nyquist theorem or Nyquist criterion. For audio signals, the highest frequency of interest (about 20 kHz) is determined by the auditory response of human hearing. Practical, high-quality audio systems thus require sampling rates in excess of 40 ksamp/sec. In practice, sampling rates of 44,100 samp/sec and 48,000 samp/sec are used for compact disc and digital audio tape devices, respectively.

In many cases the fixed sampling rate of such audio systems, chosen to adequately reproduce the highest possible audio frequency of interest, is sampling signals that have little or no high-frequency content. For instance, if a 100-Hz sine wave is sampled at 44,100 samples/sec, the signal is actually being sampled at a rate which is much higher than that required by the Nyquist criterion (200 samp/sec). Under these circumstances many more samples are used to represent the signal than the Nyquist criterion actually requires.

When decimation is used by the present invention during the subset selection process, the lossless audio coder adaptively determines an appropriate sampling rate for the signal activity in each uncompressed input block. For instance, if an uncompressed input block contains a signal whose highest frequency is 1 kHz, a sampling rate of 2 ksamp/sec is sufficient to reproduce the signal according to the Nyquist criterion. If the uncompressed input signal was sampled at 48 ksamp/sec, it should be possible to select every 24th sample of the original waveform (48 ksamp/sec divided by 2 ksamp/sec) and still be able to reconstruct the 1 kHz waveform according to the Nyquist criterion. Since the lossless audio coder can try several decimation ratios and can choose the one which results in the best compression ratio, it can decimate the signal by increasingly larger (integral) values until it discovers that the 1 kHz signal can be decimated by 24 without loss of fidelity. A higher decimation ratio means that fewer samples are required to represent the signal than are actually provided by the fixed sampling rate of the audio system. The present invention exploits this result to provide a reduction of the storage required to represent the original audio signal.

If a signal is sampled according to the Nyquist theorem, it is possible to recreate the original signal to any arbitrary level of quality by interpolating between the samples. Although a method known to those skilled in the art as sinc interpolation is optimal for recreating the original signal, other interpolation methods may also be used. The purpose of the approximation methods used in the approximation step of the lossless and loss-limited audio encoder and decoder is to re-create the samples which are discarded by the subset selection (decimation) process. If the appropriate subset samples are chosen, second subset samples 37 are very well approximated by interpolating between first subset samples 36.

The accuracy of the approximation of second subset samples 37 determines the amplitude of the error samples 38. Error samples 38 represent the difference between the approximated samples 40 and second subset samples 37. When the subset samples are well-chosen, the samples in the error array contains relatively small values. When the approximation is successful, the error array exhibit the characteristics of a random sequence of numbers.

The purpose of derivative encoder 28 will now be explained. As is described in the prior art, derivative techniques are successful in decreasing the number of bits required to represent a signal because there is usually a reasonably high correlation between successive samples in sampled data signals. Whenever the fixed sampling rate of an audio system is higher than that required by the Nyquist criterion, the signal representation contains redundancies. These redundancies are decreased by taking one or more derivatives of the oversampled signal. Rather than always taking the first derivative of the original signal, as is done by prior-art differential pulse-code modulation (DPCM) systems, derivative encoder 28 selects the "best" derivative from among its input signal and the signal's first, second, and third derivatives. The "best" derivative is simply that derivative which results in the smallest block floating point representation of the original signal.

Finally, the theory behind block floating point encoder 70 is explained. When an array containing M fixed-point samples is converted to block floating point representation, the block size N is a design parameter. When N=1, each fixed-point sample is encoded as a (mantissa, exponent) pair. When N=M, a single exponent is used for all mantissas. In the latter case, this exponent is necessarily the exponent of the largest magnitude sample in the fixed-point array. When the block size is near N=1, too many bits are wasted in representing the exponents, since there are correlations between the exponents of consecutive samples. When the block size is near N=M, bits are wasted in representing the mantissas, because not all mantissas require as many bits as does the maximum magnitude sample of the input array. The present invention uses an adaptive blocking factor for both the first subset samples 36 and error samples 38 of each compressed block. Block floating point encoder 70 performs this adaptation. The selected blocking factors are stored in the header of each compressed block 50.

8.0 Source Code Listing

The following C source code demonstrates an implementation of the present lossless audio compression method. Calling routines and file input/output which are specific to a particular operating system (such as Apple Macintosh System 7.5 or Microsoft DOS 6.22) have been omitted for clarity. It will be apparent to one skilled in the art that other implementations, data structures, and algorithms may be used to improve the operations demonstrated in the following source code. The source code is included here to demonstrate that the operations required by the present invention have been reduced to practice.

8.1 Main Routine

The following C routine processes two input files named "file1" and "file2" using lossy compression shift factors 0, 1, 2, and 3 to determine the resulting compression ratio. A shift factor of 0 results in lossless compression. A variable named "compressing" determines whether the operation performed by maino is compression or decompression.

---

```
- - - Begin C source code for main() - - -
Copyright © 1996 Albert Wegener. All rights reserved.
#define WINDOW_LENGTH 480   /*   Define input window size           */
#define GROUP_LEN 3          /*   Block floating point group factor  */
#define NUM_DERIVS 3         /*   Number of derivatives we'll try    */
```

```
#define NUM_BUFS 32          /* Number of buffers per file read   */
#define N_HIST 40             /* Number of entries in histogram    */
#define OUT_WORD_SIZE 16      /* Number of bits/output array entry */
#define N_HEADER_BITS 16      /* Number of header bits/compr. block */
main()
{
    int     *inArray, *outArray, shiftFactor;
    int     fileNum, numBits, numBitsMin, numBitsMax;
    int     numSamps=WINDOW_LENGTH, maxOutBuf=WINDOW_LENGTH;
    int     compressing = 0; /* compress = 0, decompress = 1 */
    float   timeLocal = 0.0, timeInc, bSum, bAvg;
    /* Get memory for various buffers. */
    inArray = (int *) malloc(2*WINDOW_LENGTH);
    outArray = (int *) malloc(2*WINDOW_LENGTH);
    /* Loop thru input files using right-shift factors 0..3 */
    for (shiftFactor = 0; shiftFactor < 4; shiftFactor++) {
        /* Now read in an input file, maxOutBuf samples at a time */
        for (fileNum = 1; fileNum<3; fileNum++) {
            switch (fileNum) {
                case 1:  inFile = fopen("file1","rb");
                         break;
                case 2:  inFile = fopen("file2","rb");
                         break;
                default: break;
            }
            /* If we can't open the file, get next fileNum */
            if (!inFile)
                break;
            outFile = fopen("fileOut","wb");
            count = 0.0;
            timeInc = (float) numSamps / S_RATE;
            while ( inArray = newBuffer(inFile) ) {
                timeLocal += timeInc;
                count     += 1.0;
                /* Process the current input buffer  */
                if (compressing) {
                    numBits = compress(inArray, numSamps, shiftFactor);
                } else {
                    numBits = decompress(inArray,numSamps,shiftFactor);
                }
                /* Write processed array to disk   */
                ans = writeDisk(outArray, numSamps);
                /* Update compression statistics   */
                bSum += (float) numBits;
                if (numBits > numBitsMax) {
                    numBitsMax = numBits;
                }
                if (numBits < numBitsMin) {
                    numBitsMin = numBits;
                }
            }
            bAvg = bSum / count;
            fclose(inFile);   /* Close the input file  */
            fclose(outFile);  /* Close the output file */
        }   /* End fileNum loop    */
    }       /* End shiftFactor loop */
}
```

8.2 Subroutine Data Structure Declarations

The following data structures are declared to characterize various statistical parameters during compression. These parameters are primarily used for debugging and system characterization.

```
- - - Begin C source code for data struct declaration - - -
Copyright © 1996 Albert Wegener. All rights reserved.
extern int   sDerivStats[NUM_DERIVS];  /* Take subset derivs 0, 1, 2, and 3 */
extern int   eDerivStats[NUM_DERIVS];  /* Take error derivs 0, 1, 2, and 3  */
extern int   sLevelStats[17];          /* Save subset levels here  */
extern int   eLevelStats[17];          /* Save error levels here   */
extern int   downStats[9];             /* Downsample by 2 ... 8    */
extern long  sSum, eSum;
```

```
extern long    sMin, sMax, eMin, eMax;    /*  min/max, subset/error arrays   */
extern long    nsSum, neSum;
extern int     numExponents;              /*  Number of different exponents  */
struct hist                               /*  Levels histogram entry         */
       int count;
       int loc;
};
struct params {                           /*  Statistics summary entry       */
    int    sLevs;
    int    sDeriv;
    int    eLevs;
    int    eDeriv;
    int    sBits;
    int    eBits;
} params;
```

8.3 Derivative Subroutine

The following subroutine takes the derivative of an input array "inArray". The first "start" samples are not modified by the deriv subroutine.

```
        - - - Begin C source code for deriv() - - -
Copyright © 1996 Albert Wegener. All rights reserved.
    void
deriv(start, inArray, length)
    int    start;
    int    inArray[];
    int    length;
{
    int    cur, prev, k;
    prev = inArray[start-1];
    /*   Replace signal array with its derivative   */
    for (k = start; k < length; k++) {
         cur = inArray[k];
         inArray[k] = cur - prev;
         prev = cur;
    }
    return;
}
```

8.4 Integration Subroutine

The following subroutine takes the integral of an input array "inArray". The first "start" samples are unaffected by the integ subroutine.

```
        - - - Begin C source code for integ() - - -
Copyright © 1996 Albert Wegener. All rights reserved.
    void
integ(start, inArray, length)
    int    start;
    int    inArray[];
    int    length;
{
    int    cur, prev, k;
    prev = inArray[start];
    /*   Replace signal array with its integral   */
    for (k = start+1; k < length; k++) {
         cur = inArray[k];
         inArray[k] = cur + prev;
         prev = cur;
    }
    return;
}
```

8.5 Mantissa/Exponent Array Creation Subroutine

The following subroutine calculates the compressed length of input array "inarray" using a block floating point format. The input parameter "groupLen" is the blocking factor of the block floating point format. "groupLen" consecutive entries of "inArray" are examined for their maximum magnitude, and the exponent (number of bits) required to encode the maximum for that group is determined. This process is repeated for all groups until the exponents for the array have been determined. A histogram of exponents (called "histo") is created during the exponent calculation process. This histogram is used to assign Huffman codes to specific exponent lengths.

```
            Begin C source code for calcPackedLength( )
Copyright © 1996 Albert Wegener. All rights reserved.
    int
calcPackedLength (inArray, length, nExps, groupLen)
    int    inArray[];
    int    length;
    int    *nExps;
    int    groupLen;
{
    static    int firstcall=1;
    static    int *lookup;
    static    int expArray[WINDOW_LENGTH];
    static    int packWeights[ ] =
                  {1,2,3,4,5,7,7,7,10,10,10,10,10,10,10,10};
    static    int histo [17];
    static    struct hist    hist2 [17], hist3 [17];
    int       i, j, jLast, k, count, max, exponent, bitCount, curSamp;
    int       max_hist_count, maxLoc, numPack2, maxLevel;
    /*    During the first call of this subroutine, create a numBits
          lookup table with 256 entries, enough for an 8-bit (one byte)
          index into the table. This is faster than a ceil ( log2(N) )
          calculation. */
```

```
                Begin C source code for calcPackedLength( )
if (firstCall) {
            lookup = (int *) malloc (2*256);
            if (lookup == 0)
                return;
            k = 0;
            lookup[k++] = 1;   /*   Number of bits for a
                                    sample value of 0 is 1 */
            for (i=1; i<9; i++) {
                count = pow(2,i-1);
                for (j=0; j<count; j++) {
                    lookup [k++] = i;
                }
            }
            firstCall = 0;
}
/*      Zero the exponents histogram */
for (i=0; i<17; i++) {
            histo[i] = 0;
}
/*      Find the max of each group, get its exponent, and add
        that to the current bit length. Save the group exponents
        in expArray[ ]                                          */
bitCount = 0;
k=0;
for (i=0, jLast=groupLen; i<length; i+=groupLen, jLast+=groupLen) {
            max = 0;
            for (j = i; j < jLast; j++) {
                curSamp = abs (inArray[j]);
                if (curSamp > max)
                    max = curSamp;
            }
            /* Use a lookup table to determine how many bits the max
               requires. If max < 256, we can use the lookup table entry
               (# bits in exponent) directly. If max >= 256, we use the
               upper 8 bits of max to index into the lookup table, and add
               8 bits to the returned value (for the 8 LSB's of max)    */
            if (max < 256) {
                exponent = lookup [max];
            } else {
                max >>= 8;
                exponent = lookup[max] + 8;
            }
            /*    Save the exponent value in expArray      */
            expArray[k++] = exponent;
            /*    Accumulate the number of bits in packed array due
                  to mantissas only. Later on, we'll determine
                  which exponent gets which Huffman code.   */
            bitCount += groupLen * exponent;
            /*    Update the exponents histogram to see how often
                  each exponent gets used                        */
            histo [exponent]++;
}
/*      Scan the histogram array to see how many different exponents
        are used, and assign the Huffman coding from the most-used
to least-used exponent. Huffman coding is done as follows:
            1 exponent:       (static level encoded in the header)
            2 exponents:      0, 1
            3 exponents:      0, 10, 11
            4 exponents:      0, 10, 110, 111
            5 exponents:      0, 10, 110, 1110, 1111
            6 exponents:      0, 10, 110, 1110, 11110, 11111
            7 exponents:      0, 10, 110, 1110, 11110, 1111101, 1111110
                                    .
                                    .
                                    .
            16 exponents:     0, 10, 110, 1110, 11110, [5x1]00, [5x1] 01,
                              [5x1]10, [7x1]000, [7x1]001, [7x1]010,
                    [7x1]011, [7x1]100, [7x1]101, [7x1]110,
                    [7x1]111                          */
/*      See how many different exponents are used in expArray     */
numExponents = 0;
for (i=0; i<17; i++) {
            if (histo[i]) {
                hist2[numExponents].count = histo [i];
                hist2[numExponents++].loc = i;
            }
}
/*      Next, sort the hist2 array, which represents all exponents that
        get used in the packing of this input array. We need to sort
```

-continued

```
                Begin C source code for calcPackedLength( )
                hist2 to determine which exponents get represented by the
                Huffman codes. hist3 (the sorted version of hist2) will get
                turned into the Huffman table in the header for this block. We
                don't always need to sort hist2 to determine its effect on
                bitCount, but the main reason we always sort is that hist3 MUST
                always be stored in the header for the block, since it contains
                the mapping between Huffman codes & actual exponent levels. */
maxLevel = ;
for (i=0; i<numExponents; i++) {
                max_hist_count = 0;
                maxLoc = 0;
                for (j=0; j<numExponents; j++) {
                        if (hist2 [j].count > max_hist_count) {
                                max_hist_count = hist2 [j].count;
                                maxLoc = j;
                        }
                }
                hist3[i].count = max_hist_count;
                hist3[i].loc = hist2[maxLoc].loc;
                if (hist3[i].loc > maxLevel)
                        maxLevel = hist3[i].loc;
                hist2[maxLoc].count = 0;  /*   Remove histogram entry
                                                from further searches */
}
/*              Finally, determine (based on the number of different exponent
                levels) how many exponent encoding bits will be added. This
                is simply the weighted sum:
                        (# entries having this exponent)
                                *
                        (Huffman code length for this exponent)        */
switch (numExponents) {
                case 1:  break;                 /* Encode the 1 level in header   */
                case 2:  bitCount += length;    /* Huffman string 0 or 1 (1 bit)  */
                         break;                 /* for ALL exponents              */
                case 3:  bitCount +=     hist3[0].count; /* Huffman string 0      */
                         bitCount += 2 * hist3[1].count; /* Huffman string 10     */
                         bitcount += 2 * hist3[2].count; /* Huffman string 11     */
                         break;
                case 4:  bitCount +=     hist3[0].count; /* Huffman string 0      */
                         bitCount += 2 * hist3[1].count; /* Huffman string 10     */
                         bitCount += 3 * hist3[2].count; /* Huffman string 110    */
                         bitCount += 3 * hist3[3].count; /* Huffman string 111    */
                         break;
                case 5:  bitCount +=     hist3[0].count; /* Huffman code 0        */
                         bitCount += 2 * hist3[1].count; /* Huffman code 10       */
                         bitCount += 3 * hist3[2].count; /* Huffman code 110      */
                         bitCount += 4 * hist3[3].count; /* Huffman code 1110     */
                         bitCount += 4 * hist3[4].count; /* Huffman code 1111     */
                         break;
                default:
                         for (i=0; i<numExponents; i++) {
                                bitCount += packWeights[i] * hist3[i].count;
                         }
                         break;
}
*nExps = numExponents;
/*              Each Huffman entry gets encoded using 4 bits. For example, if
                we are using exponents 5, 6, 4, and 7 in this array (sorted
                from most-used exponent to least-used exponent), numExponents=
                4. For this example, the Huffman table header gets encoded as
                follows:
                numExponents | most-used entry . . . least-used entry
                    (4 bits)       (4 bits)              (4 bits)
                Resulting representation of the Huffman encoding table:
                Decimal:     4      |    5      6      4      7
                Binary:      0100   |    0101   0110   0100   0111
                The decoder knows we're using 4 bits per Huffman encode table,
                so once we get numExponents = 4, the decoder knows that a
                Huffman code having 4 distinct symbols gets used to encode
                the exponents. The subsequent 4 (numExponents) entries
                represent the most-used to least-used exponents:
                Decoder mapping of Huffman strings to levels:
```

|  |  | String represents |
|---|---|---|
| Huffman string: | Length of string | this exponent: |
| 0 | 1 | 5 |
| 10 | 2 | 6 |
| 110 | 3 | 4 |
| 111 | 3 | 7 |

```
                    -continued
            Begin C source code for calcPackedLength( )
     # bits in Huffman table = numExponents * 4, plus 4 for numExponents.
     */
     bitCount += ( (numExponents+1) << 2 );
     return bitCount;
}
```

8.6 Derivative Encoder Subroutine

The following subroutine calculates the minimum, compressed length of input array "inArray" when the input array and its first, second, and third derivatives are encoded in a block floating point format. "derivEncode" selects that derivative which results in the smallest block floating point (compressed) output array.

```
            - - - Begin C source code for derivEncode() - - -
Copyright © 1996 Albert Wegener. All rights reserved.
     int
derivEncode(inArray, length, nExps, minDeriv)
     int    inArray[ ];
     int    length;
     int    *nExps;
     int    *minDeriv;
{
     int    n_exps, groupLen = GROUP_LEN;
     int    minBits, numBits2, numBits3;
     /*    Pack the input array, to see how many bits we need    */
     minBits = calcPackedLength(inArray, length, &n_exps, groupLen);
     *nExps = n_exps;
     *minDeriv = 0;
     /*    Take the first derivative of the subset & pack that    */
     deriv(1, inArray, length);
     minBits = calcPackedLength(inArray, length, &n_exps, groupLen);
     *nExps = n_exps;
     *minDeriv = 1;
     /*    Take the second derivative of the subset & pack that    */
     deriv(2, inArray, length);
     numBits2 = calcPackedLength(inArray, length, &n_exps, groupLen);
     /*    If second derivative uses fewer bits than first derivative,
           try packing the third derivative.    */
     if (numBits2 < minBits) {
          minBits = numBits2;
          *nExps = n_exps;
          *minDeriv = 2;
          /*    Take the third derivative of the subset & try
                packing that    */
          deriv(3, inArray, length);
          numBits3 = calcPackedLength(inArray,length,&n_exps,
                groupLen);
          if (numBits3 < minBits) {
               minBits = numBits3;
               *nExps = n_exps;
               *minDeriv = 3;
          }
     }
     return minBits;
}
```

8.7 Integration Decoder Subroutine

The following subroutine integrates an input array "inarray" the number of times specified in the "derivLevel" input parameter.

```
            - - - Begin C source code for integDecode() - - -
Copyright © 1996 Albert Wegener. All rights reserved.
     int
integDecode(inArray, length, derivLevel)
     int    inArray[ ];
     int    length;
     int    derivLevel;
```

```
                    -continued
{
     /*    Integrate the array once or twice, if derivLevel = 1 or 2,
           respectively.    */
     switch (derivLevel) {
          case 0:    break;
          case 1:    integ(1, inArray, length);
                     break;
          case 2:    integ(2, inArray, length);
                     integ(1, inArray, length);
                     break;
          default:   break;
     }
     return;
}
```

8.8 Subset Creation (Downsampling) Subroutine

The following subroutine downsamples an input array "inarray" by the decimation factor specified in the input variable "dFac".

```
            - - - Begin C source code for integDecode() - - -
Copyright © 1996 Albert Wegener. All rights reserved.
     int
downsamp(inArray, subset, dFac, length)
     int    inArray[ ];
     int    subset[ ];
     int    dFac;
     int    length;
{
     int    i, j;
     for (i = 0, j = 0; i < length; i += dFac, j++) {
          subset[j] = inArray[i];
     }
     return;
}
```

8.9 Down-shifting Subroutine (for loss-limited compression)

The following subroutine performs down-shifting of the values in the input array "inArray". The number of bits to down-shift is specified by the input parameter "shiftFac."

```
            - - - Begin C source code for downShift() - - -
Copyright © 1996 Albert Wegener. All rights reserved.
     void
downShift(inArray, length, shiftFac)
     int    inArray[ ];
     int    length;
     int    shiftFac;
{
     int    i;
     if ( (shiftFac < 1) || (shiftFac > 15) )
          return;
     for (i = 0; i < length; i++) {
          inArray[i] >>= shiftFac;
     }
     return;
}
```

8.10 Up-shift Subroutine (for loss-limited compression)

The following subroutine performs up-shifting of the values in the input array "inArray". The number of bits to up-shift is specified by the input parameter "shiftFac." This routine is called during decompression (decoding) during lossy decompression, to compensate for a fixed amount of right-shift during compression processing.

```
- - - Begin C source code for upShift() - - -
Copyright © 1996 Albert Wegener. All rights reserved.
    void
upShift(inArray, length, shiftFac)
    int     inArray[];
    int     length;
    int     shiftFac;
{
    int     i;
    if ( (shiftFac < 1) || (shiftFac > 15) )
        return;
    for (i = 0; i < length; i++) {
        inArray[i] <<= shiftFac;
    }
    return;
}
```

8.11 Approximation Subroutine

The following subroutine implements an optimized version of Bessel interpolation. This routine is optimized for a decimation factor of 2.

```
- - - Begin C source code for approx() - - -
Copyright © 1996 Albert Wegener. All rights reserved.
    int
approx(inArray, subset, error, length)
    int     inArray[];      /* Original input array         */
    int     subset[];       /* Subset array (decimated by 2) */
    int     error[];        /* Error array (returned)       */
    int     length;         /* length of input array        */
{
    int     i, j, k;
    long    y0, y1, y2, y3, sum;
    /* Interpolate between each sample to create the output array, */
    /* using the Bessel coefficients -1, +9, +9, and -1            */
    /* Create the error array using the equation:                  */
    /*      error[i] = approx[i] - inArray[i];                     */
    y0 = 0;
    y1 = (long) subset[0];
    y2 = (long) subset[1];
    y3 = (long) subset[2];
    for (i = 1, j = 0, k = 3; i < N; i += 2, j++, k++) {
        sum = -y0;                  /* sum = -y0                       */
        sum += (y1<<3) + y1;        /* sum = -y0 + 9y1                 */
        sum += (y2<<3) + y2;        /* sum = -y0 + 9y1 + 9y2           */
        sum -= y3;                  /* sum = -y0 + 9y1 + 9y2 - y3      */
        sum >>= 4;                  /* approx[j] = sum / 16            */
        error[j] = (int) sum - inArray[i];
        y0 = y1;
        y1 = y2;
        y2 = y3;
        y3 = (long) subset[k];
    }
    return;
}
```

8.12 Decompression Approximation Subroutine

The following subroutine implements an optimized version of Bessel interpolation for approximation during decompression. This routine is optimized for a downsampling factor of 2. The only difference between the approxD subroutine (below) and the approx subroutine (Section 8.11) is that the approx subroutine calculates an error array, while approxD only calculates the approximated array.

```
- - - Begin C source code for approxD() - - -
Copyright © 1996 Albert Wegener. All rights reserved.
    int
approxD(subset, apprx, length)
    int     subset[];       /* Subset array (decimated by 2) */
    int     apprx[];        /* Approximated array (returned) */
    int     length;         /* length of subset array        */
{
    int     i, j, k;
    long    y0, y1, y2, y3, sum;
    /* Interpolate between each sample to create the output array, */
    /* using the Bessel coefficients -1, +9, +9, and -1            */
    y0 = 0;
    y1 = (long) subset[0];
    y2 = (long) subset[1];
    y3 = (long) subset[2];
    for (i = 1, j = 0, k = 3; i < N; i += 2, j++, k++) {
        sum = -y0;                  /* sum = -y0                       */
        sum += (y1<<3) + y1;        /* sum = -y0 + 9y1                 */
        sum += (y2<<3) + y2;        /* sum = -y0 + 9y1 + 9y2           */
        sum -= y3;                  /* sum = -y0 + 9y1 + 9y2 - y3      */
        sum >>= 4;                  /* approx[j] = sum / 16            */
        apprx[j] = (int) sum;
        y0 = y1;
        y1 = y2;
        y2 = y3;
        y3 = (long) subset[k];
    }
    return;
}
```

8.13 One-Array Compression Control Subroutine

The following subroutine compresses an input array "inArray" using the decimation factor specified by the input parameter "dFac". The "params" structure is used to gather statistics about the various compression parameters, and is not used for encoding or decoding.

```
- - - Begin C source code for compress1() - - -
Copyright © 1996 Albert Wegener. All rights reserved.
    int
compress1(inArray, dFac, length, params)
    int     inArray[];
    int     dFac;
    int     length;
    struct  params *params;
{
    int     sLength, eLength, sBits, eBits, n_exps, deriv;
    int     groupLen = GROUP_LEN;
    static int subset[2*WINDOW_LENGTH], error[2*WINDOW_LENGTH];
    static int approx[2*WINDOW_LENGTH];
    /* Define subset array length and error array length */
    sLength = length / dFac;
    eLength = length - sLength;
    /* Create the subset array, pack it, and update subset params */
    downsamp(inArray, subset, dFac, length);
    sBits = derivEncode(subset, sLength, &n_exps, &deriv);
    params—>sBits = sBits;
    params—>sExps = n_exps;
    params—>sDeriv = deriv;
    /* Create the error array, pack it, and update error params */
    approx(inArray, error, dFac, length);
    eBits = derivEncode(error, eLength, &n_exps, &deriv);
    params—>eBits = eBits;
    params—>eExps = n_exps;
    params—>eDeriv = deriv;
    /* Return the compressed length in bits,                */
    /* including N_HEADER_BITS bits for the header          */
    return (sBits + eBits + N_HEADER_BITS);
}
```

8.14 Adaptive Compression Control Subroutine

The following subroutine repeatedly compresses an input array "inArray" using several decimation factors. This subroutine selects that decimation factor which requires the fewest number of bits for the resulting compressed array. This subroutine also optionally applies a lossy compression shift factor if the input parameter "shiftfactor" is greater than zero. A "shiftFactor" of zero indicates lossless compression. In the following subroutine, integer decimation ratios of 2 through 6 are tried.

Begin C source code for compress( )

```
Copyright © 1996 Albert Wegener. All rights reserved.
    int
compress (inArray, length, shiftFactor)
    int   inArray[ ];
    int   length;
    int   shiftFactor;
{
    int   minBits=16*WINDOW_LENGTH, minFac, numBits, dFac,
          nBits;
    struct params minParams;
    if (shiftFactor > 0)
        downshift(inArray, length, shiftFactor);
    for (dfac = 2; dFac > 7; dFac++) {
        minBits = compress1 (inArray, dFac, length, &params);
        /*  If current downsampling factor uses less bits than  */
        /*  current winner, we have a new winner.               */
        if (numBits < minBits) {
            minBits    = numBits;
            minParams  = params;
        }
    }
    return minBits;
}
```

8.15 Adaptive Decompression Control Subroutine

The following subroutine decompresses a compressed input block. This subroutine is written specifically for the preferred embodiment in which the subset selection method is decimation by 2. After extracting the header parameters from the compressed block header, the subset and error arrays are retrieved from the compressed block. The non-subset samples are approximated using the subset samples. Finally, the original array is re-created by interleaving the subset samples with the approximated samples plus the error signal.

Begin C source code for decompress( )

```
Copyright © 1996 Albert Wegener. All rights reserved.
    int
decompress (inArray, length, shiftFactor)
    int   inArray[ ];
    int   length;
    int   shiftFactor;
{
    int   subset[2*WINDOW_LENGTH],
          error[2*WINDOW_LENGTH];
    int   approx_array[2*WINDOW_LENGTH];
    /*  Extract the global header params from the compressed array */
    getHeader(inArray, headerParams);
    /*  Using the header parameters, retrieve the subset and error
        arrays from the compressed input array.                 */
    getSubset(inArray, length, headerParams, subset);
    getError(inArray, length, headerParams, error);
    /*  Call the integration decoder for the subset and error arrays,
        using the corresponding number of integration steps specified
        in the header.                                          */
    integDecode (subset, length, headerParams.subsetDeriv);
```

-continued

Begin C source code for decompress( )

```
    integDecode (error, length, headerParams.errorDeriv);
    /*  Approximate the non-subset samples using the subset samples */
    approxD(subset, approx_array, length);
    /*  Combine subset array with (approx_array + error)        */
    for (i=0, j=0; i < length; i += 2; j++) {
        outArray[i] = subset[j];
        outArray[i+1] = approx_array[j] + error[j];
    }
    /*  If the packed array was lossy-compressed, adjust for the
        down-shifting during compression by up-shifting now.   */
    if (headerParams.shiftFactor > 0)
        upshift (outArray, length, headerParams.shiftFactor);
    return;
}
```

9.0 Conclusion, Ramifications and Scone of Invention

Accordingly, the reader can conclude that the lossless audio compression method of this invention can be used to effectively and repeatedly compress audio, speech, music, and other sampled data signals, providing identical reconstruction of the original sampled data signal. In addition, the method described can be implemented in real time using a general-purpose computer because the operations required for its implementation are simple, consisting primarily of additions, subtractions, multiplications, and comparisons. The alternative loss-limited audio compression and decompression method described herein allows a user to specify a desired audio quality level which can be varied according to the available storage capacity and/or transmission bandwidth. The lossy compression method can be adapted to provide a fixed compression ratio. Finally, the present invention also includes an indexing capability for both lossless and loss-limited compression, whereby any arbitrary starting time within the compressed audio file can be determined. This indexing capability allows users of the present invention to edit and select subsets of the compressed material, rather than having to uncompress the entire file to access a particular section thereof.

While my above description contains many specificities, these should not be construed as limitations on the scope of the invention, but rather as an exemplification of one preferred embodiment thereof. Many other variations are possible. For example, a) the error array can be omitted, resulting in an additional savings by not requiring header, mantissa, and exponent bits for the error array, which often contains relatively small values, b) the compressed block header can be made smaller by making some header parameters constant, with the exception of the subset derivative level and the subset Huffman encoding parameters, c) more derivatives above the third (e.g. fourth, fifth, etc.) can be tried by the derivative encoder, d) fewer derivatives can be tried for the error array by the derivative encoder, since the error array often contains random values which cannot effectively be compressed by higher derivatives, e) the decoder can try all possible combinations of approximation methods, subset selection methods, derivative levels, and block floating point blocking factors and choose that combination which creates the smallest encoded (compressed) array. In the preferred embodiment, only the derivative levels are varied when selecting the "best" array, since there appears to be little advantage when processing most sampled data signals from varying the other parameters.

Accordingly, the scope of the invention should be determined not by the embodiments illustrated, but by the appended claims and their legal equivalents.

I claim:

1. A sampled data compression method which compresses input blocks of digitized signals, especially speech, audio, or audiovisual signals, that are regularly sampled at a rate of K samples per second and B bits per sample, where said input blocks are replaced by a stream of compressed blocks comprising:
   (a) grouping said sampled data signal into input blocks containing N consecutive samples, in which each said input block requires N*B bits of storage or transmission,
   (b) applying a partitioning method to each said input block to create a first subset containing N1 samples of the input signal and a second subset containing N2 samples of the input signal, where N1+N2=N,
   (c) applying an approximation method to said first subset of N1 samples to create an approximation signal containing N2 samples which approximates said second subset,
   (d) subtracting said approximation signal from said second subset to create an error signal containing N2 samples,
   (e) applying an encoding method to said first subset of N1 samples to create an encoded first subset requiting C1 bits of storage or transmission, wherein said encoded first subset identically represents said first subset of N1 samples using fewer than N1*B bits,
   (f) applying an encoding method to said error signal of N2 samples to create an encoded error signal requiring C2 bits of storage or transmission, wherein said encoded error signal identically represents said error signal of N2 samples using fewer than N2*B bits,
   (g) creating a header containing control bits requiring C3 bits of storage or transmission, which said control bits indicate said block size N, said partitioning method used to create said first subset, said approximation method used to create said approximation signal, said encoding method used to encode said first subset, and said encoding method used to encode said error signal,
   (h) combining said encoded first subset, said encoded error signal, and said header containing control bits into a compressed block requiring C1+C2+C3 bits of storage or transmission, where C1+C2+C3 is less than N*B, and
   (i) combining consecutive said compressed blocks into said stream of compressed blocks.

2. The method of claim 1, wherein said step of applying a partitioning method to create a first subset is performed using decimation.

3. The method of claim 1, wherein said step of applying a partitioning method to create a first subset is performed by selecting local maxima and minima.

4. The method of claim 1, wherein said step of applying an approximation method to create an approximation signal is performed using Bessel interpolation.

5. The method of claim 1, wherein said step of applying an approximation method to create an approximation signal is performed using cubic interpolation.

6. The method of claim 1, wherein said step of applying an encoding method to create an encoded first subset is performed using a derivative encoder.

7. The method of claim 1, wherein said step of applying an encoding method to create an encoded first subset is performed using a Huffman encoder.

8. The method of claim 1, wherein said step of applying an encoding method to create an encoded error signal is performed using a derivative encoder.

9. The method of claim 1, wherein said step of applying an encoding method to create an encoded error signal is performed using a Huffman encoder.

10. The method of claim 1, further including a method for compressing said sampled data signal with a predetermined degradation factor which reduces the amplitude of said sampled data signal by an amount controlled by said predetermined degradation factor.

11. The method of claim 1, further including a method for compressing said sampled data signal with a predetermined degradation factor which reduces the amplitude of said error signal by an amount controlled by said predetermined degradation factor.

12. The method of claim 1, in which at least one of the following selections is made in order to minimize the size of each compressed block, and in which the resulting selections are indicated by control bits stored within said compressed block header, further including:
   (a) from a plurality of partitioning methods, selecting that partitioning method which creates the smallest compressed block,
   (b) from a plurality of approximation methods, selecting that approximation method which creates the smallest compressed block,
   (c) from a plurality of encoding methods, selecting that encoding method which creates the smallest encoded first subset,
   (d) from a plurality of encoding methods, selecting that encoding method which creates the smallest encoded error signal, and
   (e) identifying said selected partitioning method, said selected approximation method, said selected first subset encoding method, and said selected error signal encoding method using control bits in said compressed block header.

13. The method of claim 12, further including a method for compressing said sampled data signal with a predetermined degradation factor which reduces the amplitude of said sampled data signal by an amount controlled by said predetermined degradation factor.

14. The method of claim 12, further including a method for compressing said sampled data signal with a predetermined degradation factor which reduces the amplitude of said error signal by an amount controlled by said predetermined degradation factor.

15. The method of claim 12, in which said stream of compressed blocks is stored in a storage medium in a format containing the following:
   (a) said compressed block header containing said selection parameters,
   (b) said minimally encoded first subset, and
   (c) said minimally encoded error signal.

16. In the sampled data compression system of claim 12, a decompression method for recovering said stream of sampled data signals from said stream of compressed blocks, comprising the steps of:
   (a) recovering said partitioning method, approximation method, first subset encoding method, and error signal encoding method control bits from said compressed block header, (b) applying the decoding method corresponding to said first subset encoding method control bits to recover said first subset from said compressed block, (c) applying the decoding method corresponding to said selected error signal encoding method control bits to recover said error signal from said compressed block, (d) applying the approximation method specified by said approximation method control bits to said recovered first subset to create an approximated second subset, (e) adding said approximated second subset to said recovered error signal to create a recovered second subset, and (f) applying the subset recombination method corresponding to said selected partitioning method control bits which combines said first subset and said recovered second subset into said recovered stream of sampled data signals.

17. The method of claim 15, further including increasing the amplitude of said recovered stream of sampled data signals by an amount specified by amplitude control bits in said compressed block header.

18. The method of claim 15, further including increasing the amplitude of said recovered error signal by an amount specified by amplitude control bits in said compressed block header.

19. In the sampled data compression system of claim 1, a decompression method for recovering said stream of sampled data signals from said compressed stream of compressed blocks, said decompression method comprising the steps of:

(a) separating each said compressed block into a block header, an encoded first subset, and an encoded error signal, (b) recovering the first subset encoding method control bits, the error signal encoding method control bits, the approximation method control bits, and the subset partitioning method control bits from said block header, (c) applying the decoding method corresponding to the encoding method specified by said first subset encoding method control bits to recover the first subset, (d) applying the decoding method corresponding to the encoding method specified by said error signal encoding method control bits to recover the error signal, (e) processing said recovered first subset in the manner specified by said approximation method control bits to create an approximated second subset, (f) adding said approximated second subset to said recovered error signal to create a reconstructed second subset, (d) combining said recovered first subset and said reconstructed second subset in the manner corresponding to said subset partitioning method control bits to create a recovered uncompressed block, and (h) combining consecutive said uncompressed blocks into said stream of sampled data signals.

20. In a sampled data decompression system, a decompression method for recovering a stream of sampled data signals from a stream of compressed blocks, each compressed block containing an encoded first subset derived by partitioning said sampled data signal into a first subset and a second subset, an encoded error signal derived by subtracting said second subset from an approximated second subset generated using said first subset as input to an approximation method, and a header containing control bits which indicate said partitioning method used to create said first subset, said approximation method used to create said approximation signal, said encoding method used to encode said first subset, and said encoding method used to encode said error signal, said decompression method comprising the steps of:

(a) separating each said compressed block into a block header, an encoded subset, and an encoded error signal, (b) recovering the first subset encoding method control bits, the error signal encoding method control bits, the approximation method control bits, and the subset partitioning method control bits from said block header, (c) applying the decoding method corresponding to the encoding method specified by said first subset encoding method control bits to recover the first subset, (d) applying the decoding method corresponding to the encoding method specified by said error signal encoding method control bits to recover the error signal, (e) processing said recovered first subset in the manner specified by said approximation method control bits to create an approximated second subset, (f) adding said approximated second subset to said recovered error signal to create a reconstructed second subset, (g) combining said recovered first subset and said reconstructed second subset in the manner corresponding to said subset partitioning method control bits to create a recovered uncompressed block, and (h) combining consecutive said uncompressed blocks into said stream of sampled data signals.

21. The decompression method of claim 20, wherein said step of applying a decoding method is performed using an integration decoder.

22. The decompression method of claim 20, wherein said step of applying a decoding method is performed using a Huffman decoder.

23. The decompression method of claim 20, wherein said step of processing said recovered first subset to create an approximated second subset is performed using Bessel interpolation.

24. The decompression method of claim 20, wherein said step of processing said recovered first subset to create an approximated second subset is performed using cubic interpolation.

25. The decompression method of claim 20, further including the step of accessing a specific section of uncompressed samples from within said compressed stream of code signals using an index, said index containing a list of compressed block sizes, each entry of said list representing the storage required for a predetermined number of uncompressed samples within said stream of code signals.

* * * * *